(12) United States Patent
Tachibana

(10) Patent No.: US 6,691,080 B1
(45) Date of Patent: Feb. 10, 2004

(54) TASK EXECUTION TIME ESTIMATING METHOD

(75) Inventor: Masayoshi Tachibana, Omiya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/532,047

(22) Filed: Mar. 21, 2000

(30) Foreign Application Priority Data

Mar. 23, 1999 (JP) .......................................... 11-077679

(51) Int. Cl.⁷ .............................................. G06F 17/50
(52) U.S. Cl. ............................. 703/19; 703/17; 703/21; 713/300
(58) Field of Search .............................. 703/17, 19, 21; 713/300

(56) References Cited

U.S. PATENT DOCUMENTS 6,161,200 A * 12/2000 Rees et al. ..................... 714/38
6,205,555 B1 * 3/2001 Kageshima et al. ........ 713/300

FOREIGN PATENT DOCUMENTS

| JP | 07160650 A | 6/1995 |
| JP | 10011333 A | 1/1998 |
| JP | 10161891 A | 6/1998 |
| JP | 11232147 A | 8/1999 |

OTHER PUBLICATIONS

Peuto et al., "An Instruction Timing Model of CPU Performance", Proceedings of the 4th annual symposium on Computer Architecture, 1977, pp. 165–178.*

* cited by examiner

*Primary Examiner*—W. Thomson
*Assistant Examiner*—Herng-der Day
(74) *Attorney, Agent, or Firm*—Finnegan, Henderson, Farabow, Garrett & Dunner, L.L.P.

(57) ABSTRACT

An average cache hit ratio and execution time not considering any interrupt are obtained by processes (1001–1011). A section hit ratio simulation (2006a) is done using the obtained information, interrupt generation probability information (2005), and cache scheme/cache size information (2004). A stall penalty (2008) is added to the obtained trace information (D) to attain the number of execution clocks, and the cache hit ratio and execution time are estimated. An average cache hit ratio and execution time considering an interrupt can be obtained.

8 Claims, 34 Drawing Sheets

CACHE HIT RATIO AT POINT S $H = A*R_0 + \Sigma B_i * R_i$ $R_0$: PROBABILITY OF NON-GENERATION OF INTERRUPT $R_i$: PROBABILITY OF GENERATION OF i TYPE INTERRUPT

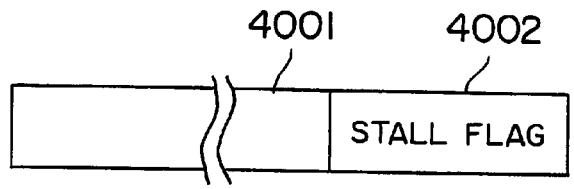
F I G. 15
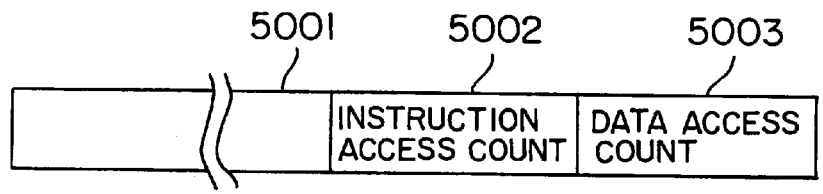
F I G. 16
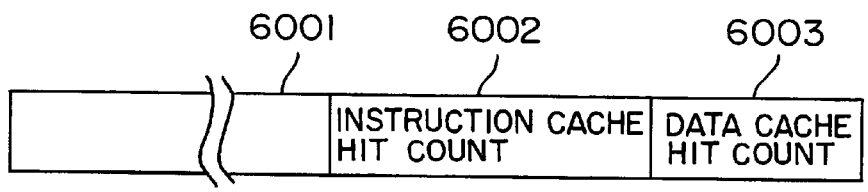
F I G. 17
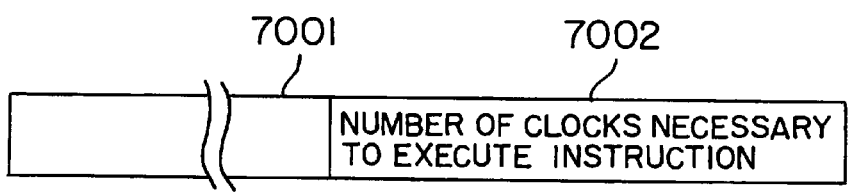
F I G. 18
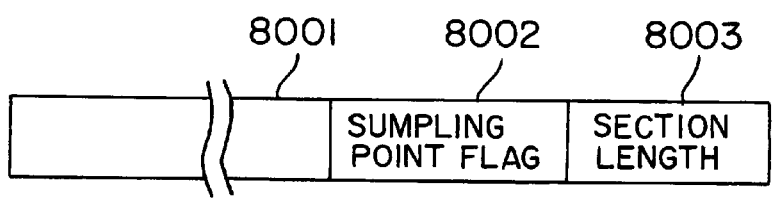
F I G. 19

| TYPE OF INTERRUPT /39001 | GENERATION PROBABILITY /39002 | CACHE PATTERN /39003 |
|---|---|---|
| A | $2.0 \times 10^{-5}$ | 30% CLEAR |
| B | $1.5 \times 10^{-6}$ | PATTERN A |
| C | $2.0 \times 10^{-7}$ | PATTERN B/D $10% |
| D | $2.0 \times 10^{-6}$ | 100% CLEAR |
| E | $1.0 \times 10^{-7}$ | 80% CLEAR |

FIG. 28

| PATTERN A | |
|---|---|
| INSTRUCTION CACHE | DATA CACHE |
| 000 | 000 |
| ⑤ | ⑤ |
| 03F | 00F |
| 100 | 030 |
| ⑤ | ⑤ |
| 11F | 03F |
| — | 100 |
| — | ⑤ |
| — | 110 |

| PATTERN B | |
|---|---|
| INSTRUCTION CACHE | DATA CACHE |
| 000 ⟨ 05F | 000 ⟨ 03F |
| 080 ⟨ 0FF | 100 ⟨ 1FF |
| 500 ⟨ 5FF | — — — |

⟍41001　　⟍41002

CPU A

| | |
|---|---|
| NUMBER OF PIPELINES | 5 |
| CLOCK FREQUENCY | 50MHz |
| BRANCH PENALTY | BRANCH 5/NOT BRANCH 0 |
| INSTRUCTION CACHE MISS PENALTY | 60nsec |
| DATA | 60nsec |
| INSTRUCTION CACHE | DIRECT MAPPING 4096 |
| DATA CACHE | DIRECT MAPPING 4096 |

(a)

CPU B

| | |
|---|---|
| NUMBER OF PIPELINES | 5 |
| CLOCK FREQUENCY | 50MHz |
| BRANCH PENALTY | BRANCH 5/NOT BRANCH 0 |
| INSTRUCTION CACHE MISS PENALTY | 60nsec |
| DATA | 60nsec |
| INSTRUCTION CACHE | DIRECT MAPPING 1024 |
| DATA CACHE | DIRECT MAPPING 1024 |

(b)

CPU C

| | |
|---|---|
| NUMBER OF PIPELINES | 3 |
| CLOCK FREQUENCY | 25MHz |
| BRANCH PENALTY | BRANCH 3/NOT BRANCH 0 |
| INSTRUCTION CACHE MISS PENALTY | 100nsec |
| DATA | 100nsec |
| INSTRUCTION CACHE | DIRECT MAPPING 1024 |
| DATA CACHE | DIRECT MAPPING 1024 |

| NBR | 5 |
|---|---|
| NISTL | 0 |
| NIF | 3 |
| NDATA | 3 |

(b)

| NBR | 3 |
|---|---|
| NISTL | 0 |
| NIF | 4 |
| NDATA | 4 |

FIG.36

| CPU C | |
|---|---|
| NUMBER OF PIPELINES | 3 |
| CLOCK FREQUENCY | 25MHz |
| BRANCH PENALTY | BRANCH 3~5/NOT BRANCH $\phi$ |
| INSTRUCTION CACHE MISS PENALTY | 100nsec |
| DATA | 100nsec |
| INSTRUCTION CACHE | DIRECT MAPPING 512 entry |
| DATA CACHE | DIRECT MAPPING 512 entry |

FIG. 47

| NBR | 3~5 |
|---|---|
| NISTL | 0 |
| NIF | 4 |
| NDATA | 4 |

FIG. 48

| 1 | 1 | 52001
| 1 | 3-1 | 52002
| 1 | 4-1 | 52003
| 3-1 | 3-2 | 52004
| 3-2 | 3-3 | 52005
| 3-3 | 1 | 52006
| 3-3 | 3-1 | 52007
| 3-3 | 4-1 | 52008
| 4-1 | 4-2 | 52009
| 4-2 | 4-3 | 52010
| 4-3 | 4-4 | 52011
| 4-4 | 1 | 52012
| 4-4 | 3-1 | 52013
| 4-4 | 4-1 | 52014

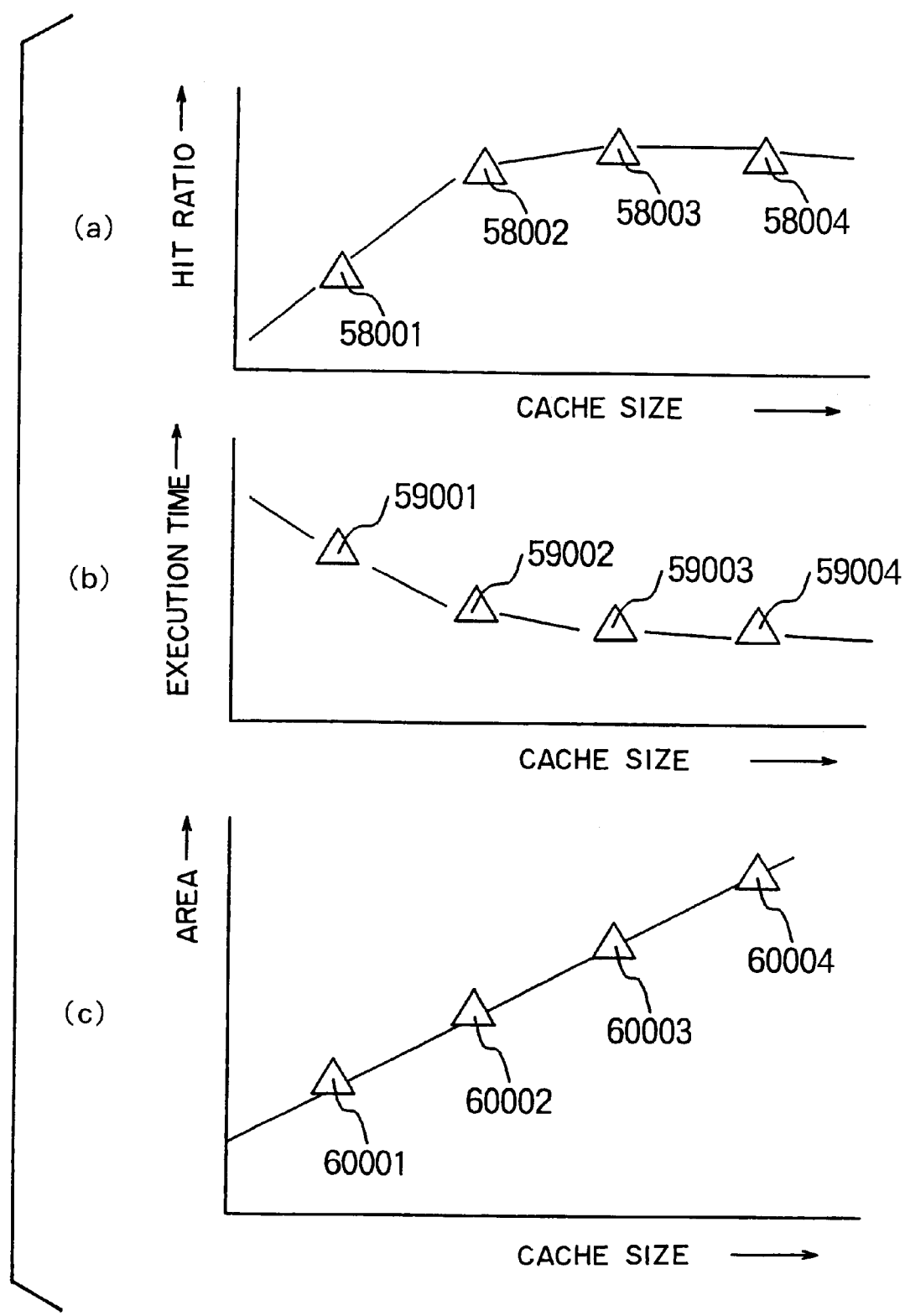
F I G. 53

TASK EXECUTION TIME ESTIMATING METHOD

BACKGROUND OF THE INVENTION

The present invention relates to a task execution time estimating method.

As a generally known method of estimating a time required for a CPU (Central Processing Unit) to execute a task, the operation of the CPU is simulated to sum up the execution times of all instructions. This method can advantageously estimate an increase in execution time caused by a pipeline stall or cache miss even for a CPU which performs pipeline control and has a cache memory. However, an increase in execution time by, e.g., an increase in the number of cache misses by an interrupt process cannot be estimated only by simulation of an instruction string. This generates an error in estimating the execution time.

In the conventional execution time estimating method, the estimating precision of the task execution time decreases when an interrupt occurs.

SUMMARY OF THE INVENTION

It is an object of the present invention to provide a task execution time estimating method capable of estimating the task execution time at high precision in consideration of an interrupt process.

A task execution time estimating method according to the present invention comprises the steps of: inputting a program, an initial data value, an execution start address, and an execution end address to an instruction level simulation portion, and outputting a first execution trace of an instruction including a pipeline stall caused by a factor including a combination of a branch and an instruction; inputting the first execution trace to a cache simulation portion, simulating a pipeline stall caused by a cache miss in correspondence with a cache scheme and a cache size, and outputting a second execution trace; inputting the second execution trace to an execution clock count portion, obtaining the number of execution clocks per instruction in accordance with the pipeline stall caused by a combination of a branch and an instruction and the pipeline stall caused by a cache miss, and outputting the number of execution clocks as a third execution trace; inputting the third execution trace to a simulator which simulates instruction execution of a central processing unit (to be referred to as a CPU hereinafter) having a cache memory and a pipeline controller, and estimating and outputting a first cache hit ratio and a first execution time of an entire program which does not consider any interrupt; inputting the output first execution trace, the first cache hit ratio, the first execution time, an interrupt generation ratio at which an interrupt occurs during task execution, and a cache memory rewrite ratio to a section hit ratio simulation portion, simulating, by a predetermined number of instructions for all interrupts, the cache rewritten in accordance with a cache memory rewrite pattern for all instructions and all interrupts included in the first execution trace, and calculating and outputting an average cache hit ratio; calculating a weighted average between the first cache hit ratio and the average cache hit ratio for each interrupt, and outputting a fourth execution trace including a cache hit ratio considering an interrupt; inputting the fourth execution trace to the execution clock count portion, counting the number of execution clocks for each instruction in accordance with the cache hit ratio and the pipeline stall caused by a combination of a branch and an instruction for each instruction, and outputting the number of execution clocks as a fifth execution trace; inputting the fifth execution trace, and estimating a cache hit ratio and an execution time of an entire program; and combining instruction execution simulators considering an interrupt, thereby estimating an average cache hit ratio and an execution time considering an interrupt.

A task execution time estimating method according to the present invention is a method of extracting specific instructions by sampling and estimating an execution time, comprising the steps of: inputting a program, an initial data value, an execution start address, and an execution end address to an instruction level simulation portion, and outputting a first execution trace of an instruction including a pipeline stall caused by a factor including a combination of a branch and an instruction; inputting the first execution trace to a cache simulation portion, simulating a pipeline stall caused by a cache miss in correspondence with a cache scheme and a cache size, and outputting a second execution trace; inputting the second execution trace to an execution clock count portion, obtaining the number of execution clocks per instruction in accordance with the pipeline stall caused by a combination of a branch and an instruction and the pipeline stall caused by a cache miss, and outputting the number of execution clocks as a third execution trace; inputting the third execution trace to a simulator which simulates instruction execution of a CPU having a cache memory and a pipeline controller, and estimating and outputting a first cache hit ratio and a first execution time of an entire program which does not consider any interrupt; inputting the output first execution trace, the first cache hit ratio, the first execution time, an interrupt generation ratio at which an interrupt occurs during task execution, and a cache memory rewrite ratio to a section hit ratio simulation portion, simulating the cache rewritten in accordance with a cache memory rewrite pattern for only a number of instructions proportional to the interrupt generation ratio that are extracted by sampling from instructions included in the first execution trace, and calculating and outputting an average cache hit ratio; calculating a weighted average between the first cache hit ratio and the average cache hit ratio for each interrupt, and outputting a fourth execution trace including a cache hit ratio considering an interrupt; inputting the fourth execution trace to the execution clock count portion, counting the number of execution clocks for each instruction in accordance with the cache hit ratio and the pipeline stall caused by a combination of a branch and an instruction for each instruction, and outputting the number of execution clocks as a fifth execution trace; inputting the fifth execution trace, and estimating a cache hit ratio and an execution time of an entire program; and combining instruction execution simulators considering an interrupt, thereby estimating an average cache hit ratio and an execution time considering an interrupt.

When the task execution time estimating method is practiced for a plurality of CPUs in which at least either cache schemes or cache sizes are different, the step of outputting the second execution trace using the cache simulation portion comprises performing a process for the cache scheme and the cache size of each CPU and obtaining the second execution trace for each CPU, and the step of calculating and outputting the average cache hit ratio using the section hit ratio simulation portion comprises performing a process for the cache scheme, the cache size, and an interrupt generation probability of each CPU, calculating the average cache hit ratio for each CPU, estimating the average cache hit ratio and the execution time considering an interrupt for each CPU, and selecting an optimal CPU in accordance with an application purpose.

Alternatively, when the task execution time estimating method is practiced for a plurality of CPUs having different numbers of pipelines, the step of outputting the third execution trace and the step of outputting the fifth execution trace comprise obtaining the third execution trace and the fifth execution trace using a stall penalty of each CPU, estimating the average cache hit ratio and the execution time considering an interrupt for each CPU, and selecting an optimal CPU in accordance with an application purpose.

Further, when the task execution time estimating method is practiced for a plurality of CPUs having different instruction sets, the step of outputting the first execution trace comprises obtaining the first execution trace using a program of each CPU, estimating the average cache hit ratio and the execution time considering an interrupt for each CPU, and selecting an optimal CPU in accordance with an application purpose.

The task execution time estimating method of the present invention can estimate an increase in task execution time caused by an interrupt. Based on this, a CPU can be selected, the cache size/scheme can be optimized, and a CPU requiring the minimum cost can be selected within a range where, e.g., a performance requirement is satisfied. In this way, determination of hardware/software tradeoffs and the like can be enabled.

BRIEF DESCRIPTION OF THE DRAWINGS

In the accompanying drawings,

FIG. 15 is an explanatory view showing a state in which a flag representing a stall caused by a combination of instructions is added to the trace information A;

FIG. 16 is an explanatory view showing a state in which the instruction and data access counts are added to the trace information A;

FIG. 17 is an explanatory view showing the contents of each instruction included in trace information B;

FIG. 18 is an explanatory view showing the contents of each instruction included in trace information C;

FIG. 19 is an explanatory view showing a state in which a sampling point and section length are added to the trace information B;

FIG. 28 is a table showing an interrupt profile;

FIG. 29 is a table showing a cache rewrite pattern A in an interrupt;

FIGS. 35A, 35B, and 35C are explanatory views showing the specifications of CPU A to CPU C;

FIGS. 36A and 36B are explanatory views showing the stall penalties of CPU A to CPU C;

FIG. 47 is an explanatory view showing the specifications of CPU D;

FIG. 48 is an explanatory view showing the stall penalty of CPU D;

FIGS. 53A, 53B, and 53C are graphs showing the cache hit ratio, execution time, and area which change depending on the cache size.

DESCRIPTION OF THE PREFERRED EMBODIMENTS

Preferred embodiments of the present invention will be described below with reference to the accompanying drawings.

Figure 1:
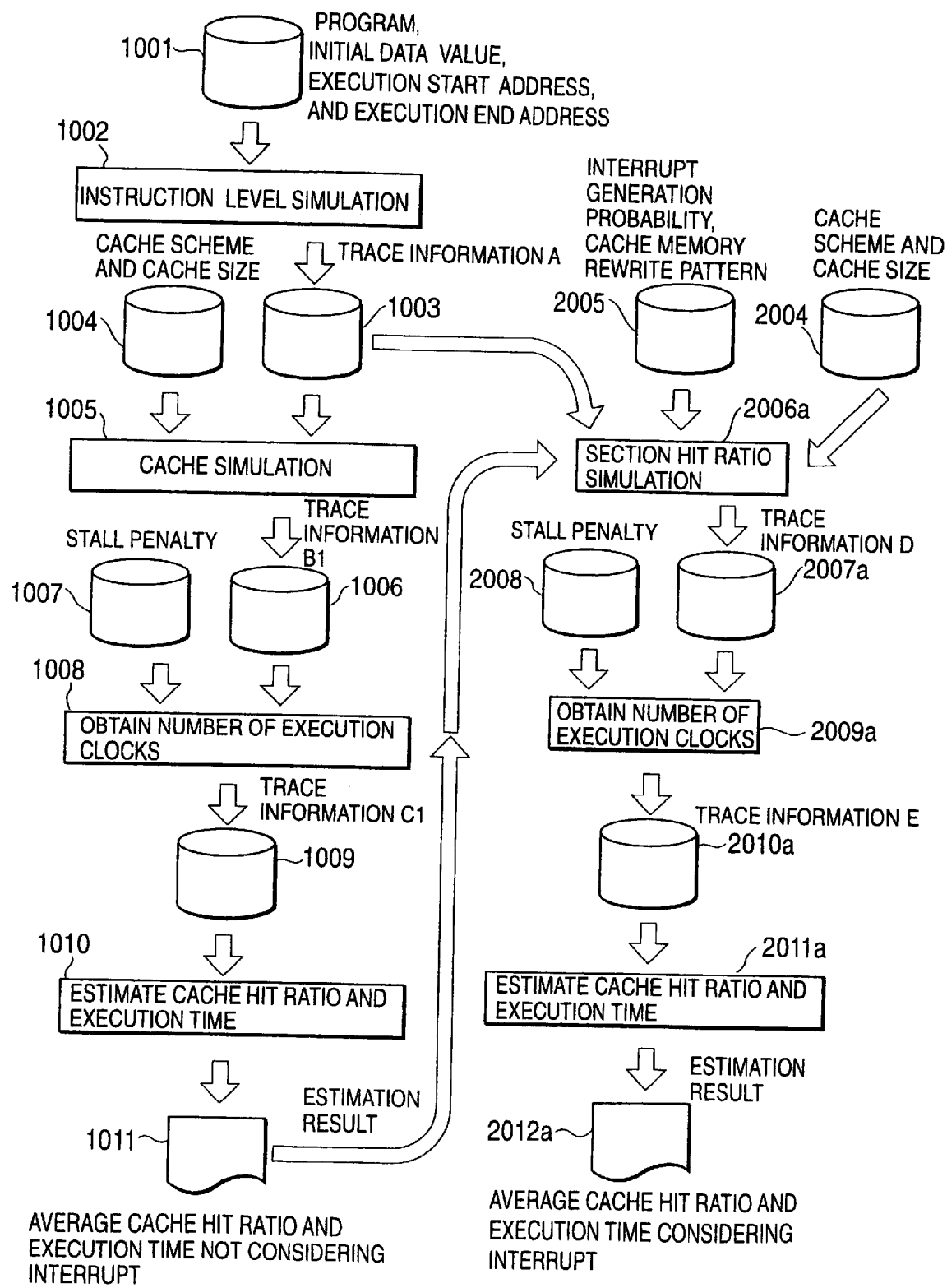
FIG. 1 is a flow chart showing a process flow in a task execution time estimating method according to the first embodiment of the present invention.

A task execution time estimating method according to the first embodiment of the present invention has a flow as shown in FIG. 1, and adopts a combination of an estimating method not considering any interrupt and an estimating method considering an interrupt. Before a description of the first embodiment, an estimating method shown in FIG. 2 that does not consider any interrupt, and an estimating method shown in FIG. 25 that considers an interrupt will be described separately. A principle capable of obtaining the cache hit ratio and task execution time that consider an interrupt will be described.

Figure 3:
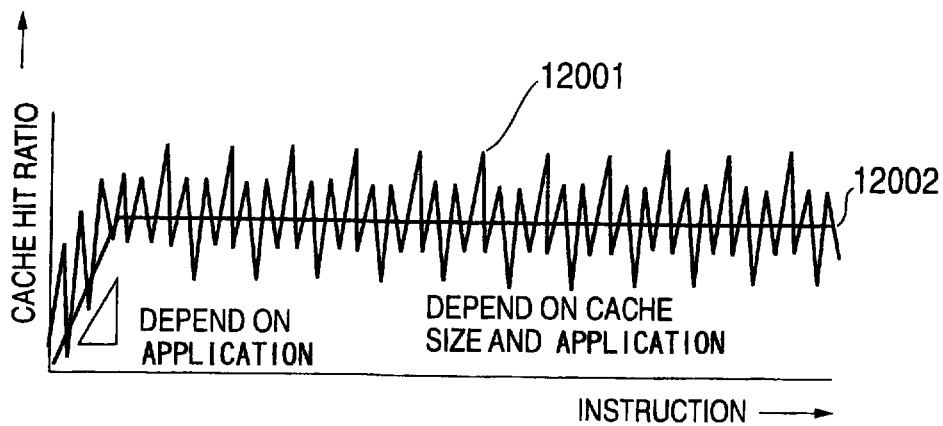
FIG. 3 is a graph showing changes in cache hit ratio when no interrupt occurs.

FIG. 3 shows the cache hit ratio during task execution when no interrupt is considered. In FIG. 3, a cache hit ratio 12001 is an average cache hit ratio when a small number of instructions are executed, and a cache hit ratio 12002 is an average cache hit ratio when a large number of instructions are executed. It is apparent from FIG. 3 that the cache hit ratio increases after the start of a task, and stabilizes at a value decided by an application. The increase ratio of the cache hit ratio depends on the contents of an application program in use, and the stabilized value depends on the cache size and program contents.

Figure 4:
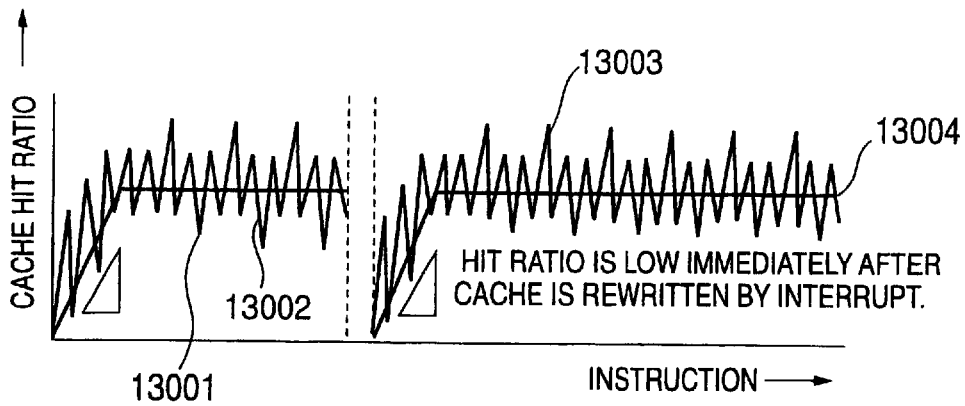
FIG. 4 is a graph showing changes in cache hit ratio when an interrupt occurs.

FIG. 4 shows changes in cache hit ratio when an interrupt is generated during task execution, and the task returns from the interrupt. In FIG. 4, cache hit ratios 13001 and 13002 correspond to the cache hit ratios 12001 and 12002 in FIG. 3, respectively. If an interrupt is generated during task execution, a cache memory is rewritten by an interrupt routine. For this reason, the cache hit ratio decreases immediately after the return from the interrupt routine, similar to the execution start of the task. However, after a sufficiently number of instructions are executed upon the return, cache hit ratios 13003 and 13004 stabilize.

Since the cache hit ratio decreases immediately after the return from the interrupt routine, the instruction execution time becomes long to prolong the total task execution time. The increase in execution time changes depending on not only the task contents and cash size but also the interrupt generation ratio and a cache memory rewrite status by the interrupt routine. Hence, the total task execution time cannot be predicted only by estimating the task execution time.

Figure 5:
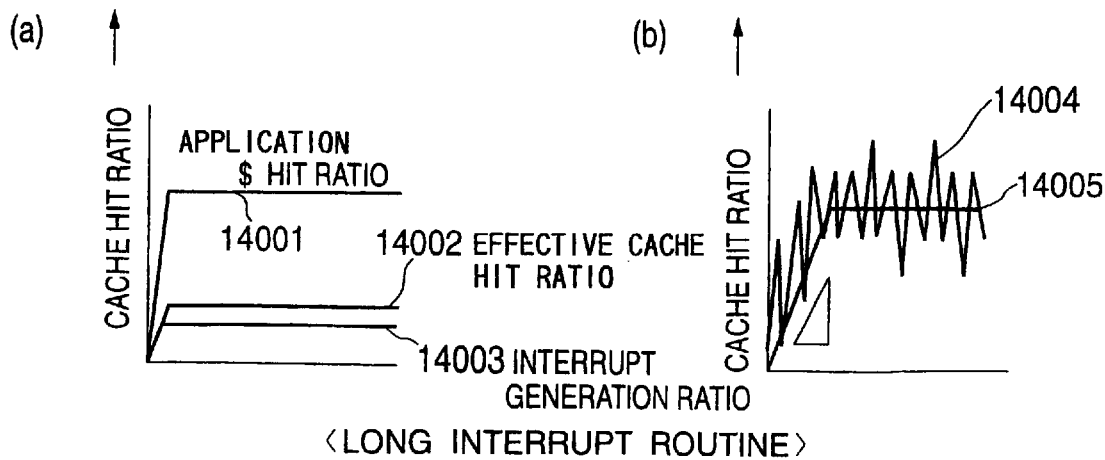
FIGS. 5A and 5B are graphs showing changes in cache hit ratio when a cache is completely rewritten by an interrupt.
Figure 6:
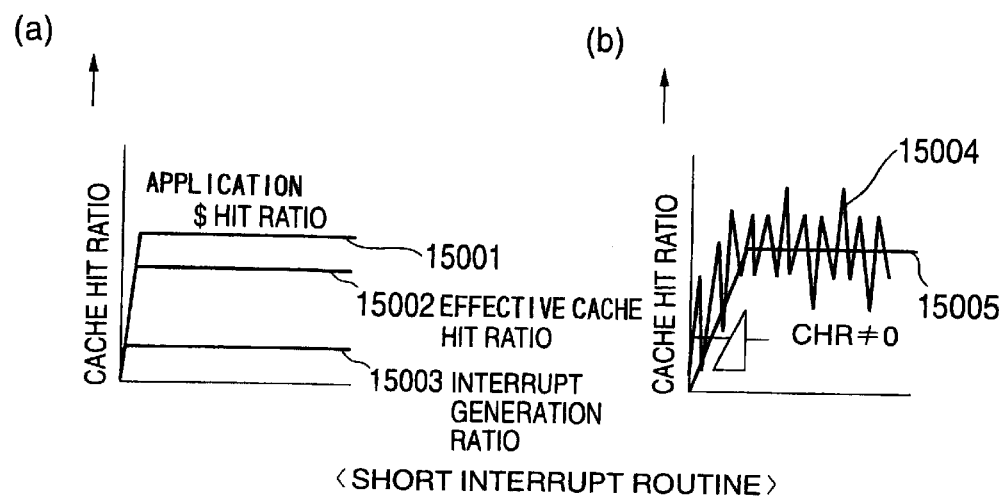
FIGS. 6A and 6B are graphs showing changes in cache hit ratio when the cache is partially rewritten by an interrupt.
Figure 7:
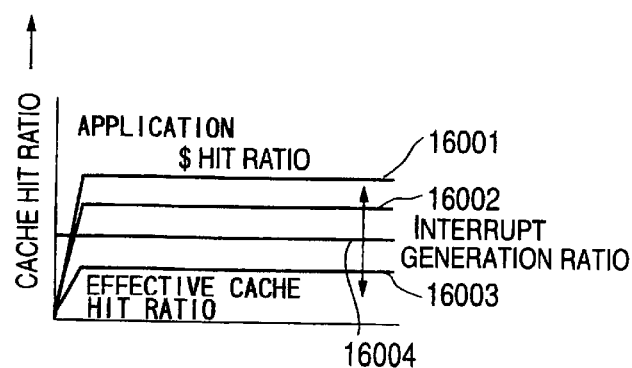
FIG. 7 is a graph showing changes in effective cache hit ratio with respect to an interrupt generation ratio.

This will be explained in more detail with reference to FIGS. 5A to 7. FIGS. 5A and 5B show cache hit ratios when the interrupt routine is long, and almost all the cache data are rewritten. Cache hit ratios 14004 and 14005 decrease to almost 0 immediately after the return from the interrupt routine.

FIGS. 6A and 6B show cache hit ratios when the interrupt routine is short, most of cache data are left without destruction, and some data are rewritten. Cache hit ratios 15004 and 15005 decrease but not to 0 immediately after the return from the interrupt routine, unlike the cache hit ratios in FIGS. 5A and 5B. The effective cache hit ratio changes depending on the interrupt generation ratio. An effective hit ratio 16003 greatly decreases for a high generation ratio, and hardly decreases for a low generation ratio.

Accordingly, it is apparent that the task execution time change depending on the interrupt generation ratio and the cache rewrite degree of the interrupt routine.

Figure 8:
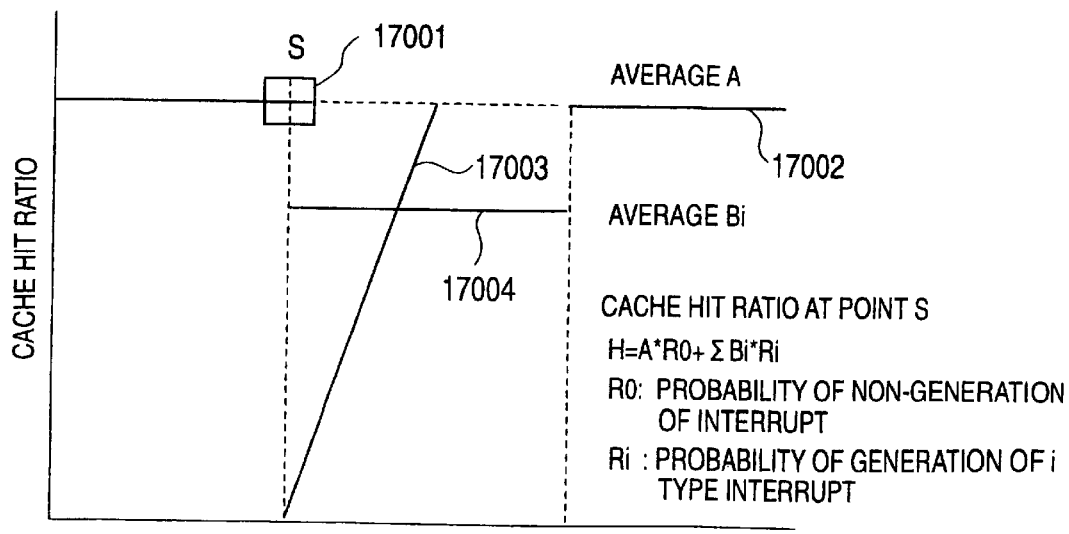
FIG. 8 is a graph showing estimation of the cache hit ratio when an interrupt is considered.

Considering this, the sequence of estimating a decrease in cache hit ratio caused by an interrupt will be explained with reference to FIG. 8. FIG. 8 shows a cache hit ratio 17001 at an execution point S of a given instruction, and an average cache hit ratio A 17002 of the cache of the whole task when no interrupt is considered. Assume that an interrupt is generated at the execution point S, the interrupt routine is executed and returns to a preceding task, and then a cache hit ratio 17003 increases to the average hit ratio A 17002. On this assumption, an average cache hit ratio Bi 17004 for a predetermined number of instructions can be calculated from the cache hit ratio 17001 at the execution point S.

The average cache hit ratio Bi 17004 is calculated for all interrupts. The weighted average between the average cache hit ratio Bi 17004 and the average cache hit ratio A 17002 when no interrupt occurs is calculated, thereby attaining an average cache hit ratio H considering an interrupt at the execution point S.

The average cache hit ratio H is calculated for all instructions, and the number of execution clocks is obtained based on the average cache hit ratio H, thereby obtaining an execution time considering an interrupt.

The sequence of the task execution time estimating method not considering any interrupt and the sequence of the task execution time estimating method considering an interrupt will be explained in comparison with each other.

Figure 2:
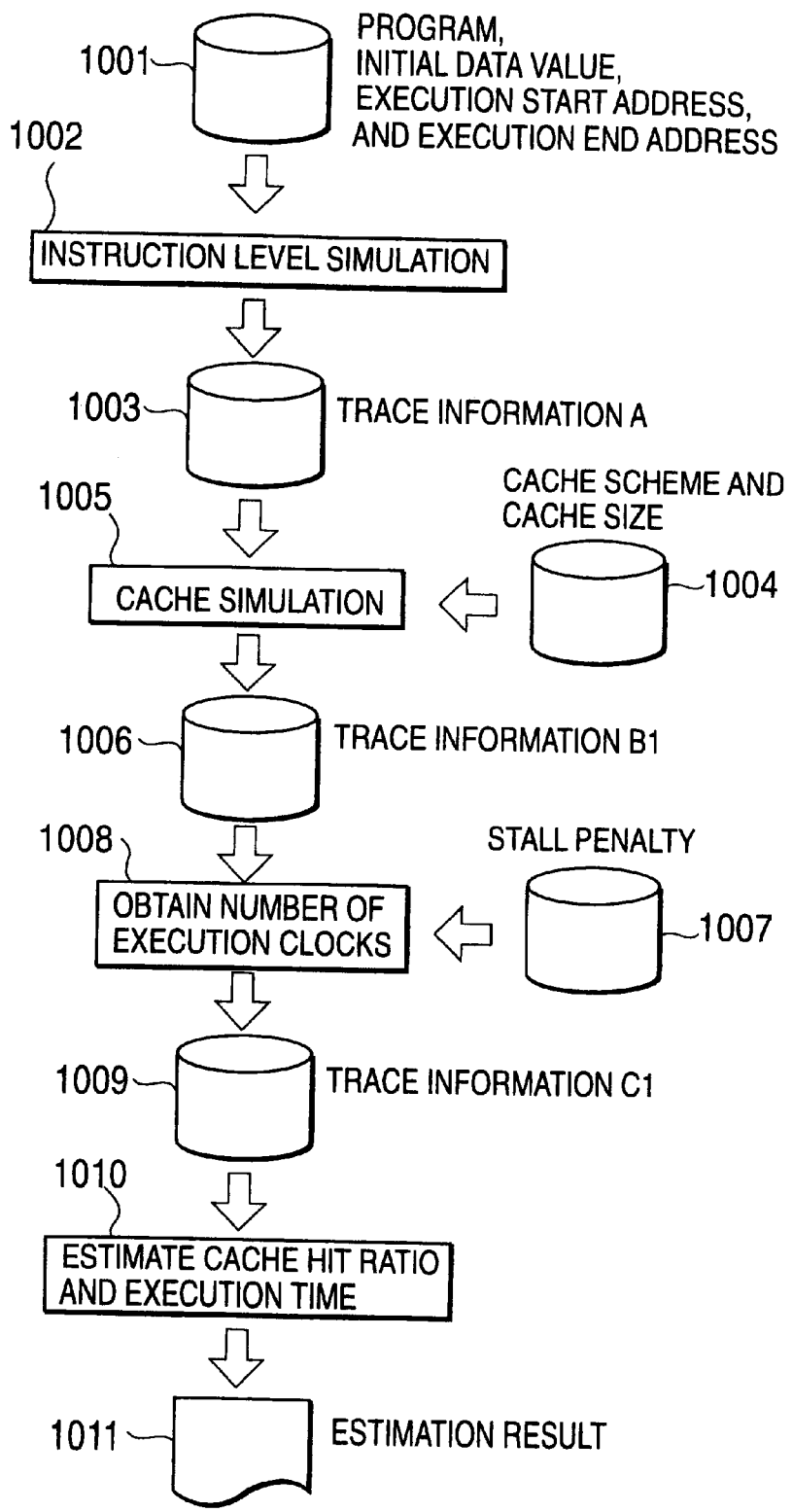
FIG. 2 is a flow chart showing a process flow in the task execution time estimating method when no interrupt is considered.

FIG. 2 is a flow chart showing the task execution time estimating method when no interrupt is considered.

A program & initial data value & execution start address & execution end address 1001 is input to an instruction level simulation 1002 to output program execution trace information A 1003.

The execution trace information A 1003 output from the instruction level simulation 1002, and cache scheme & cache size data 1004 are input to a cache simulation 1005 to output execution trace information B1 1006.

The trace information B1 1006 and stall penalty information 1007 are input to perform a process 1008 of obtaining the number of execution clocks for each instruction, thereby outputting execution trace information C1 1009.

The execution trace information C1 1009 is input to perform a process 1010 of estimating the cache hit ratio and execution time of the whole task, thereby outputting an estimation result 1011.

Figure 25:
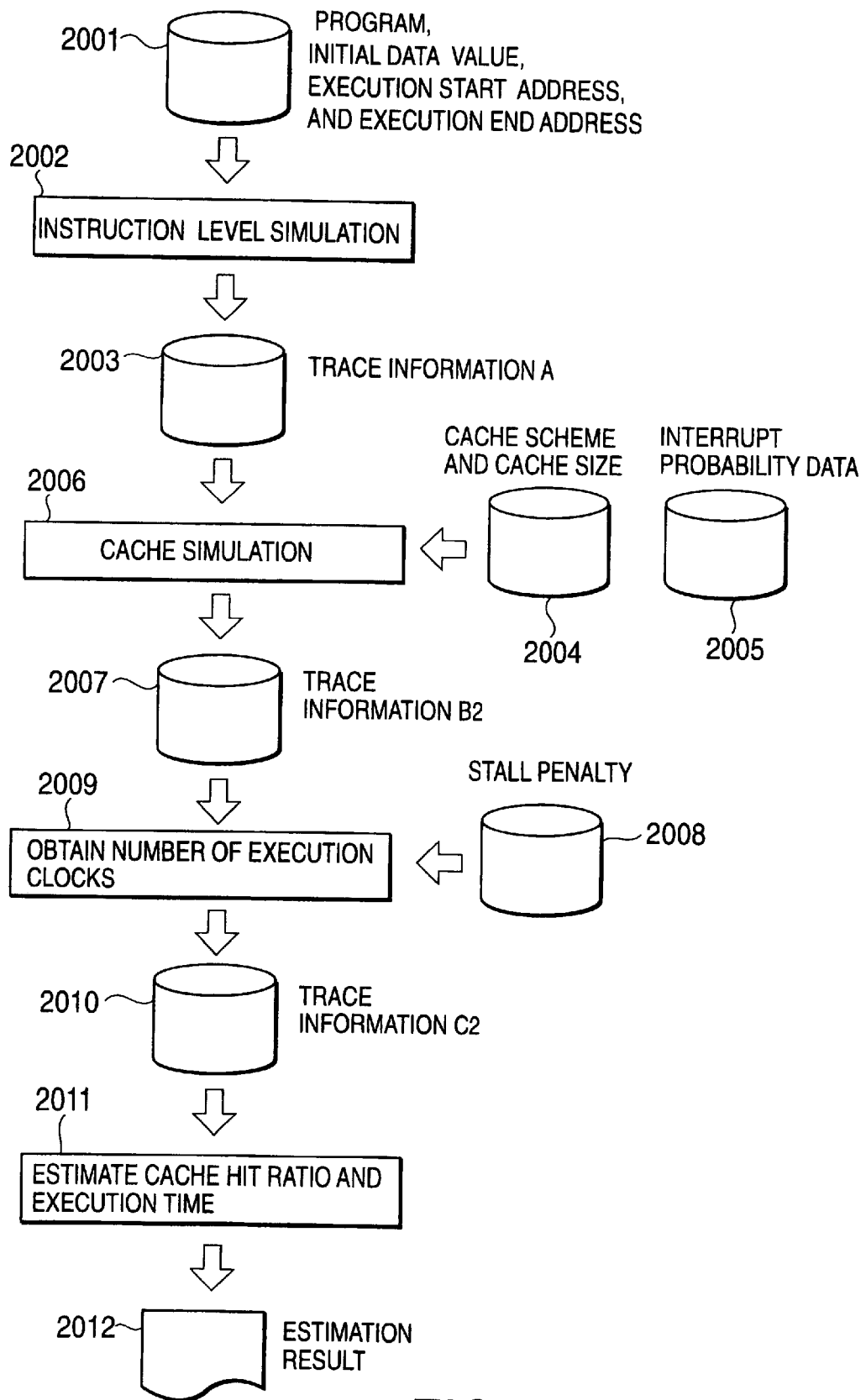
FIG. 25 is a flow chart showing the flow of a process in the task execution time estimating method when an interrupt is considered.

FIG. 25 is a flow chart showing the task execution time estimating method when an interrupt is considered.

Data 2001 about a program for estimating the execution time, an initial data value, an execution start address, and an execution end address is input to perform an instruction level simulation process 2002, thereby outputting program execution trace information A 2003.

The execution trace information A 2003, cache scheme & cache size data 2004, and interrupt probability data 2005 are input to perform a section hit ratio simulation process 2006, thereby outputting execution trace information B2 2007 including the cache hit ratio for each instruction.

The output execution trace information B2 2007 and stall penalty information 2008 are input to obtain the number of execution clocks for each instruction, thereby outputting execution trace information C2 2010. A process 2011 of estimating the cache hit ratio and execution time is done using the execution trace information C2 2010, thereby outputting an estimation result 2012.

The estimation process shown in FIG. 2 that does not consider any interrupt and the estimation process shown in FIG. 25 that considers an interrupt are compared to find that the instruction level simulation process 1002 shown in FIG. 2 and the instruction level simulation process 2002 shown in FIG. 25 have the same process contents, and also have the same input and output data. However, the subsequent processes using the trace information A 1003 and 2003 respectively output from the processes 1002 and 2002 are different from each other.

The detailed process contents of the instruction level simulation processes 1002 and 2002 are shown in the flow charts of FIGS. 9 to 13. Before a description of the instruction level simulation process, an example of execution trace information output by this process will be described with reference to FIGS. 14 to 16. As shown in FIG. 14, output execution trace information includes an instruction start address 3001, executed instruction 3002, effective address 3003 for a branch and data access, and branch flag 3004 representing that a branch occurs. Depending on a target CPU, a plurality of effective addresses 3003 may exist. In this case, the execution trace information includes all the addresses.

When a target CPU generates a pipeline stall in addition to the branch, a stall flag 4002 representing that a stall occurs must be added to information 4001 in FIG. 15 that is made up of the pieces of information 3001 to 3004 shown in FIG. 14.

When the instruction or data word length is variable in a target CPU, an instruction access count 5002 and data access count 5003 must be added to information 5001 in FIG. 16 including the information 4002 shown in FIG. 15 in addition to the pieces of information 3001 to 3004 shown in FIG. 14.

Figure 9:
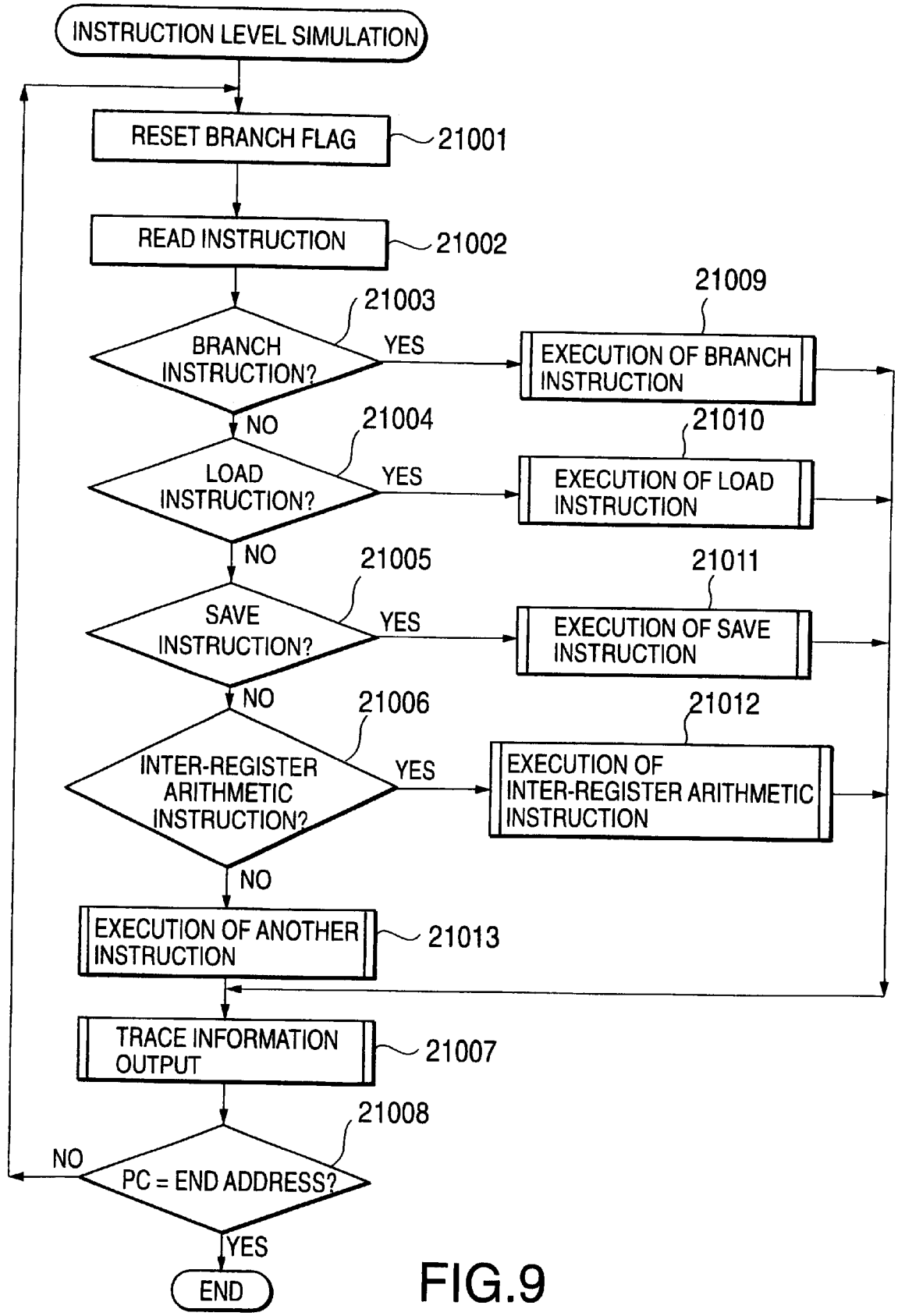
FIG. 9 is a flow chart showing the flow of an instruction level simulation process.

The contents of the instruction level simulation process for outputting such information will be described with reference to FIG. 9. A memory is initialized in accordance with input data 1001 or 2001 shown in FIG. 2 or 25, and processes 21001 to 21008 are done for each instruction of a program. Assume that the CPU executes instructions by a pipeline process, and no stall occurs except for a branch.

The branch flag is reset as the process 21001, and one instruction is read as the process 21002. The type of instruction, i.e., whether the instruction is a branch instruction, load instruction, save instruction, or inter-register arithmetic instruction is checked in the processes 21003 to 21006. If the instruction is a branch instruction, it is executed as a process 21009; if the instruction is a load instruction, it is executed as a process 21010; if the instruction is a save instruction, it is executed as a process 21011; and if the instruction is an inter-register arithmetic instruction, it is executed as a process 21012. If the instruction is not any of these instructions, it is executed as a process 21013. As the process 21007, trace information is output based on the execution result of each instruction. The processes 21001 to 21007 are repeated until a program counter PC updated by execution of each instruction indicates the end address, as shown as the process 21008.

Figure 10:
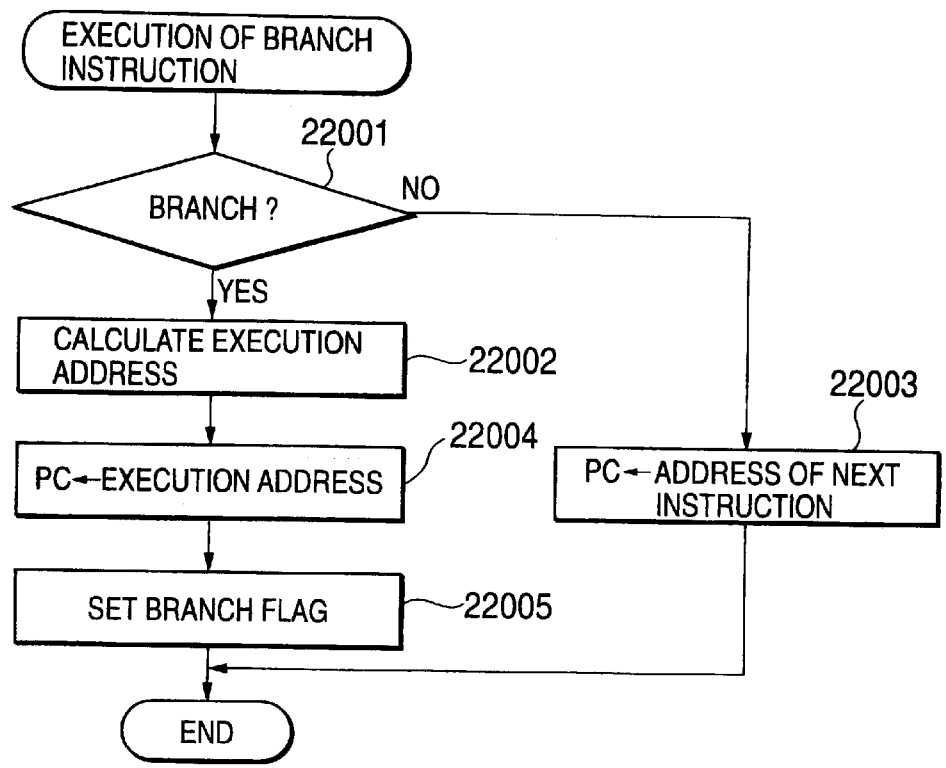
FIG. 10 is a flow chart showing the flow of a branch instruction process.

The processes 21009 to 21013 for respective instructions will be described in detail with reference to FIGS. 10 to 13. As shown in FIG. 10, the branch instruction process 21009 determines as a process 22001 whether a branch occurs. If No in the process 22001, an address next to the current instruction address is set in the program counter PC as a process 22003. If Yes in the process 22001, the execution address of a branch destination is calculated as a process 22002. The execution address is written in the program counter PC as a process 22004, and a branch flag is set as a process 22005.

Figure 11:
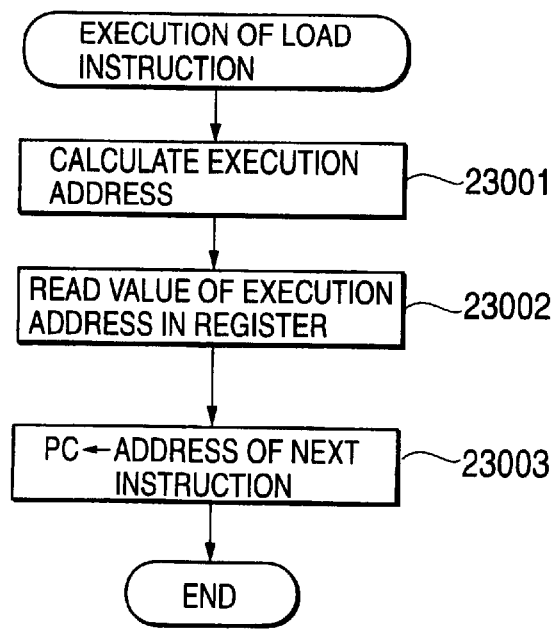
FIG. 11 is a flow chart showing the flow of a load instruction process.

The load instruction execution process 21010 is a process of executing a load instruction from a memory, and has process contents shown in FIG. 11. The effective address of the memory is calculated as a process 23001, the value of the calculated effective address is read from a register indicated by this instruction as a process 23002, and the program counter is set to the address of the next instruction as a process 23003.

Figure 12:
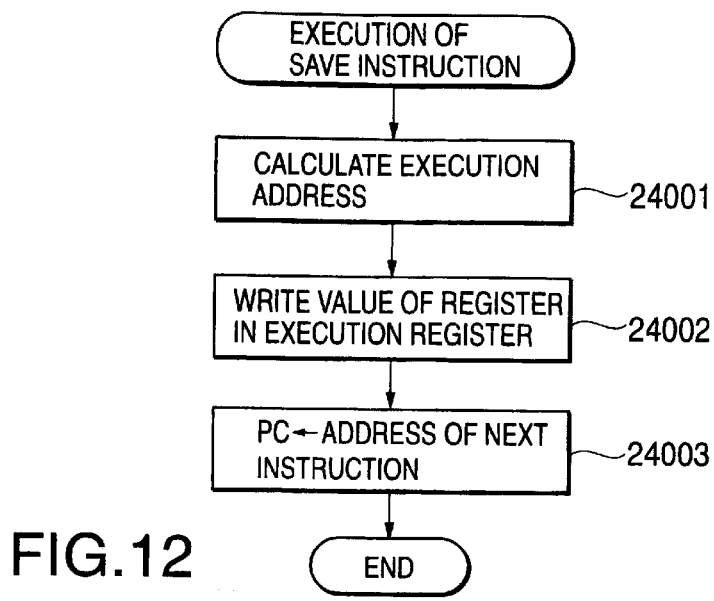
FIG. 12 is a flow chart showing the flow of a save instruction process.

The save instruction execution process 21011 is a process of executing a save instruction in the memory, and has process contents shown in FIG. 12. The effective address of the memory is calculated as a process 24001, the address value is written in a register indicated by the instruction as a process 24002, and the program counter is set to the address of the next instruction as a process 24003.

Figure 13:
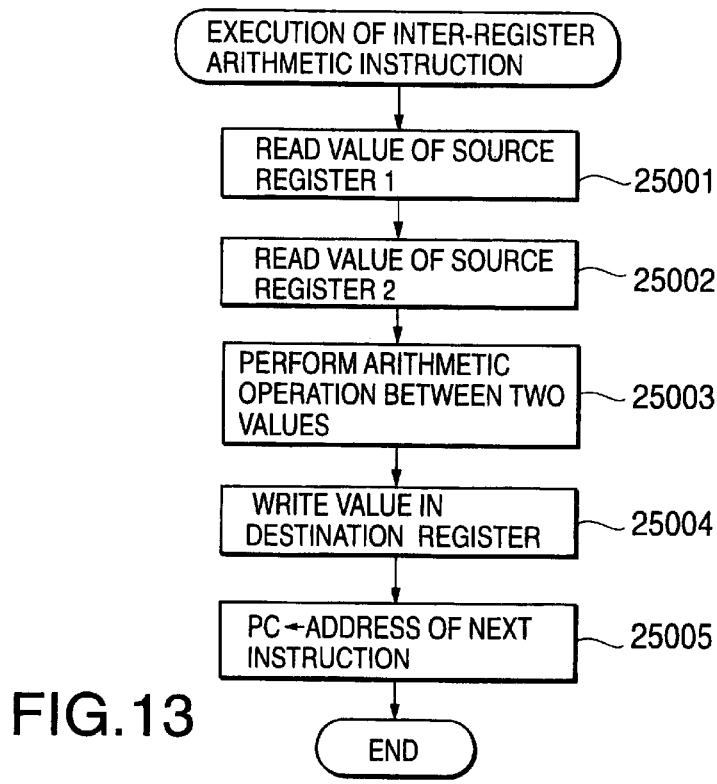
FIG. 13 is a flow chart showing the flow of an inter-register arithmetic instruction process.
Figure 14:
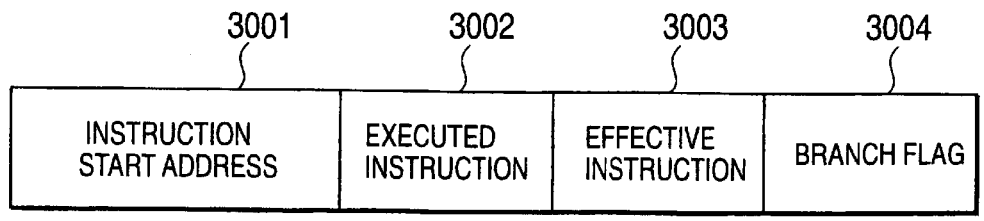
FIG. 14 is an explanatory view showing the contents of each instruction included in trace information A.

The inter-register arithmetic instruction execution process 21012 has process contents shown in FIG. 13. The value of source register 1 is read as a process 25001, and the value of source register 2 is read as a process 25002. Arithmetic operation indicated by the instruction is executed between the two read values as a process 25003, and the result is written in a destination register as a process 25004. The program counter PC is set to the address of the next instruction as a process 25005.

Similar to the processes 21009 to 21011, the execution process 21003 for another instruction is executed as if it were executed by an actual CPU. Accordingly, all the instructions the CPU should execute can be simulated.

The cache simulation process 1005 shown in FIG. 2 and the section hit ratio simulation process 2006 shown in FIG. 25 are done for the same program execution trace information A 1003 or 2003. However, the cache simulation process 1005 executes cache simulation not considering the influence of an interrupt, whereas the section hit ratio simulation process 2006 executes cache simulation considering the influence of an interrupt.

Figure 20:
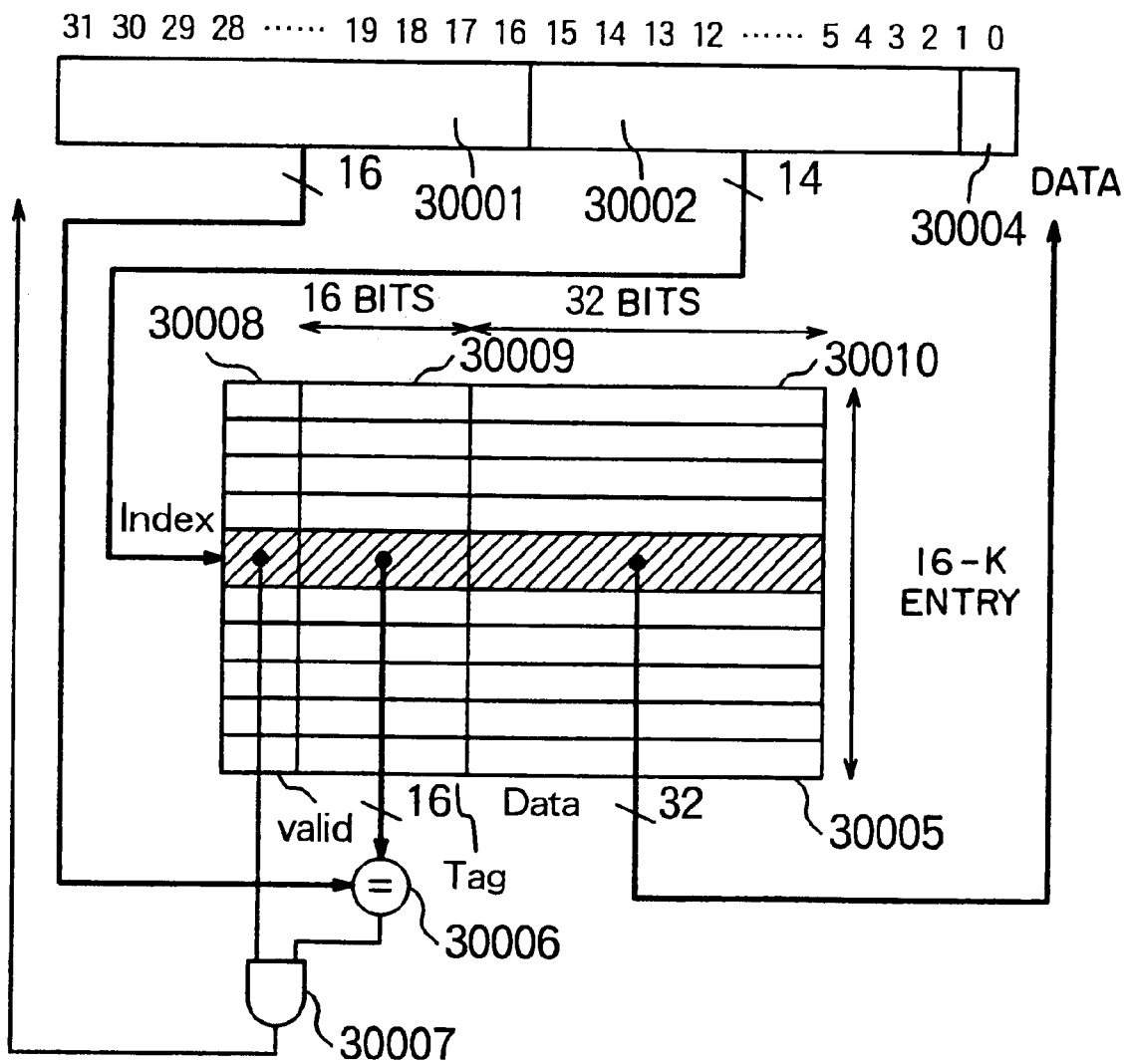
FIG. 20 is an explanatory view showing the structure of a cache memory.

The cache simulation process 1005 not considering the influence of an interrupt is a simulation process for a direct mapping/write-back type cache memory like the one shown in FIG. 20. In addition to this, the cache memory scheme includes a set associative scheme and a full associative scheme. Even for these schemes, appropriate simulation can be performed.

Assume that different cache memories are used for an instruction and data. The cache memory shown in FIG. 20 has a 32-bit address, 32-bit data, and a 16-K entry cache memory. This cache memory stores 1-bit valid data 30008, 16-bit tag data 30009, and 32-bit data 30010. The cache memory is comprised of a 16-K word memory 30005, 16-bit comparator 30006, and AND gate 30007.

The 32-bit address of the data 30010 is divided from the most significant bit into 16-bit data 30001, 14-bit data 30002, and 2-bit data 30004. The data 30010 is used as designated access data when the value of the tag data 30009 attained by accessing the memory using the data 30002 as an index coincides with the 16-bit data 30001, and the value of the valid data 30008 is "1".

Figure 21:
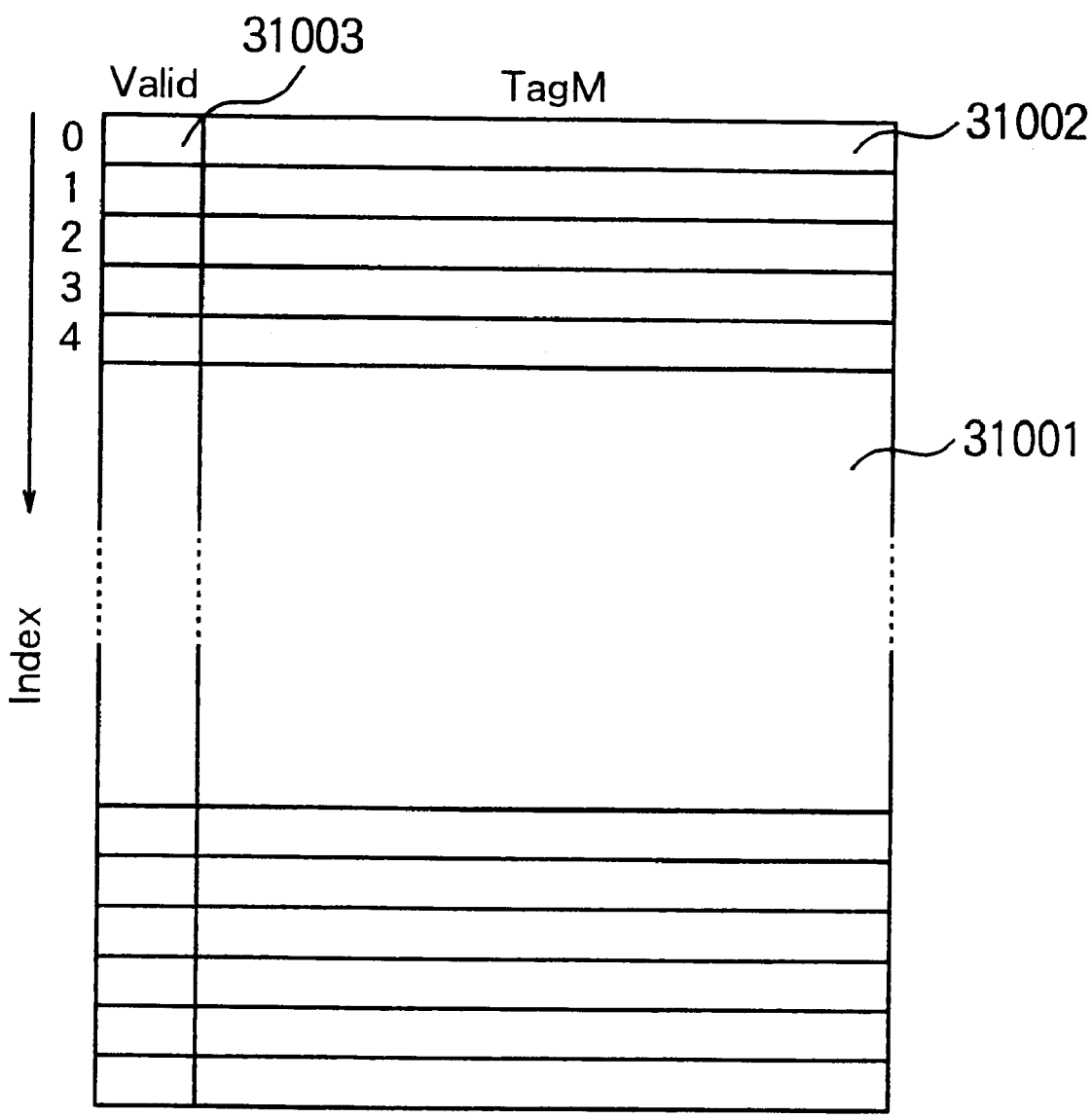
FIG. 21 is an explanatory view showing a data structure for performing cache simulation without considering any interrupt.
Figure 22:
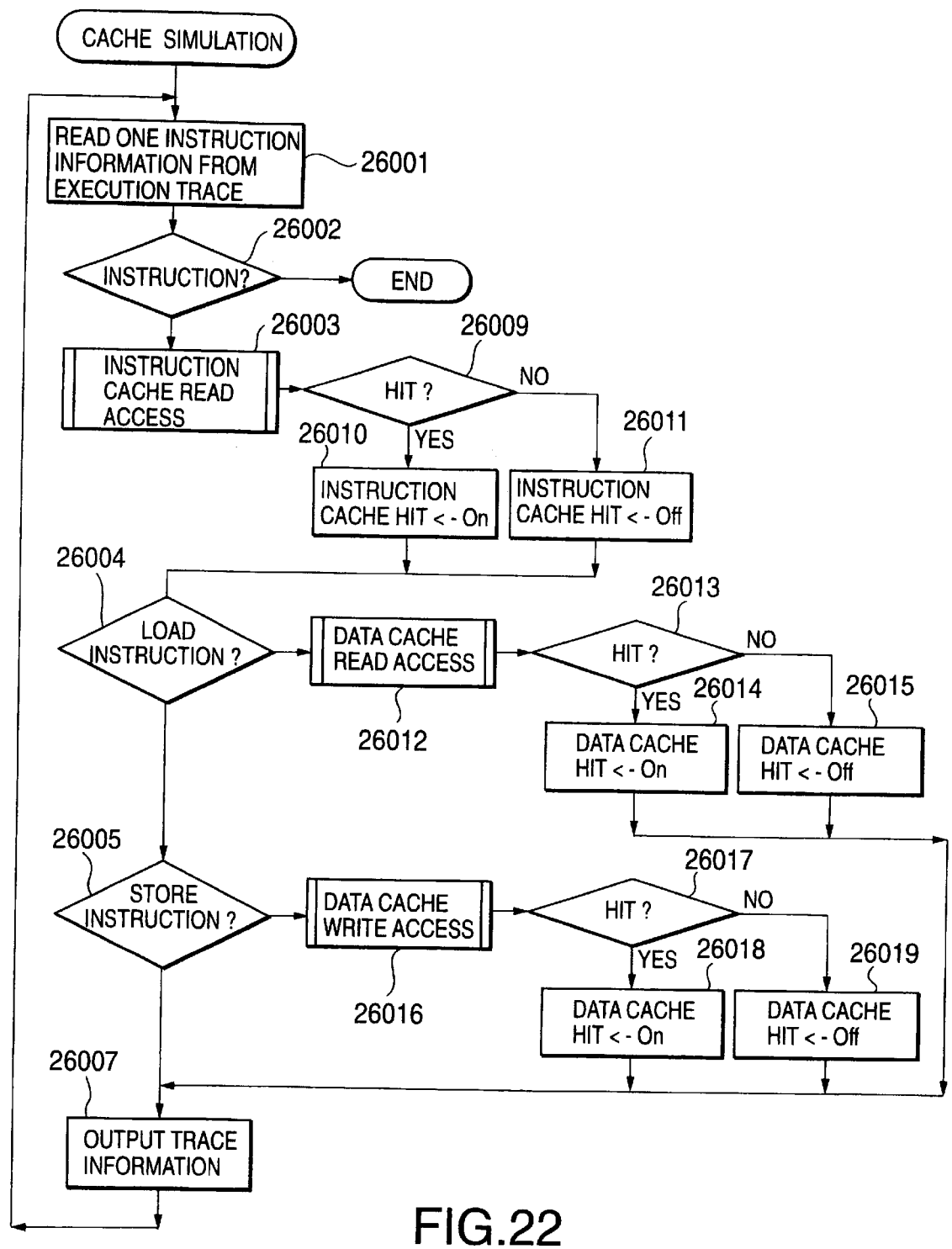
FIG. 22 is a flow chart showing the flow of a cache simulation process.
Figure 23:
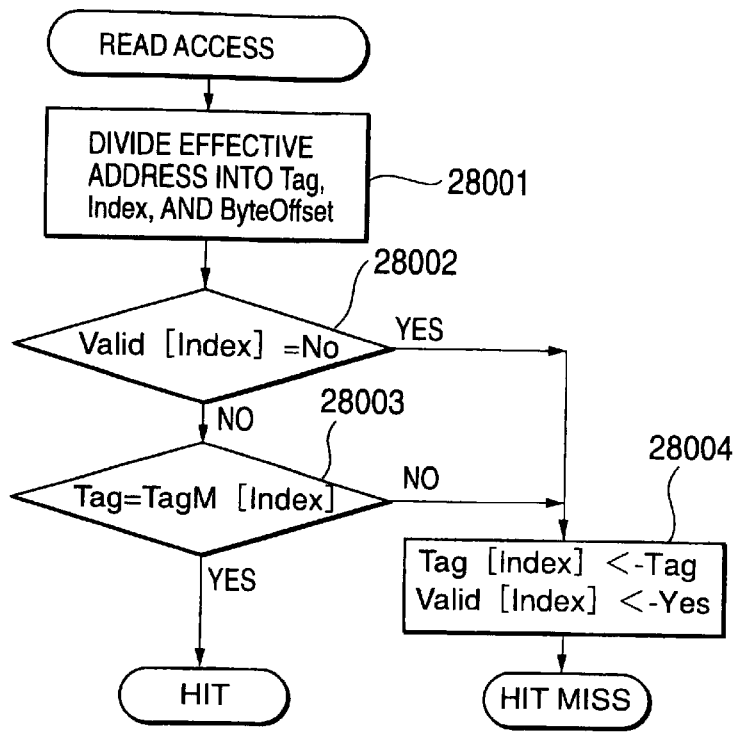
FIG. 23 is a flow chart showing the flow of a cache read access process.
Figure 24:
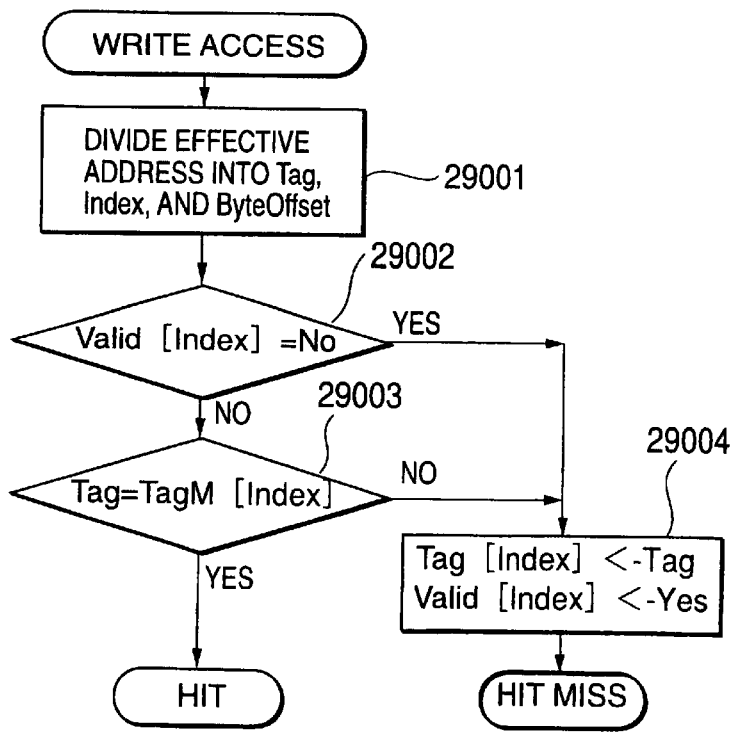
FIG. 24 is a flow chart showing the flow of a cache write access process.

Cache simulation for a memory having this arrangement uses a data structure 31001 made up of valid data 31003 and tag M 31002 as shown in FIG. 21. The sequence of the cache simulation process in this case will be explained with reference to FIG. 22 showing the entire flow, FIG. 23 showing a read access flow, and FIG. 24 showing a write access flow.

Whether an effective address is held in the cache memory is checked for each of a branch instruction, load instruction, and save instruction, and the result is output as trace information. One instruction information is read from the execution trace as a process 26001. Whether an instruction exists is checked as a process 26002. If NO in the process 26002, the flow ends; if YES, a branch instruction cache read access is done as a process 26003. Whether the cache is hit is determined as a process 26009. If Y in the process 260009, an instruction cache hit flag is set as a process 26010; if N, the flag is reset (Off) as a process 26011.

Whether the instruction is a load instruction is checked as a process 26004, and a data cache read access is performed in a process 26012. Whether the cache is hit is determined as a process 26013. If Y in the process 26013, a data cache hit flag is set as a process 26014; if N, the flag is reset as a process 26015.

Whether the instruction is a store instruction is checked as a process 26005, and a data cache write access is done in a process 26016. Whether the cache is hit is determined as a process 26017. If Y in the process 26017, the data cache hit flag is set as a process 26018; if N, the flag is reset as a process 26019.

These processes 26001 to 26019 are executed for all instructions, and the process result as trace information is output as a process 26007.

The cache memory read access process 26003 will be described in detail with reference to FIG. 23. An effective address is divided into a tag, index, byte offset as a process 28001, and whether a valid value designated by the index is "1" is checked in a process 28002. If No in the process 28002, whether a tag M value designated by the index is equal to a tag is checked in a process 28003. If Yes in the process 28003, the cache is hit. If Yes in the process 28002 and/or No in the process 28003, the cache is not hit, and a cache miss occurs. Thus, the valid value and tag M value are updated. In an actual system, data must be read from an external memory upon occurrence of a hit miss.

In this case, such operation need not be simulated.

The cache memory write access process 26016 will be described in detail with reference to FIG. 24. An effective address is divided into a tag, index, byte offset (29001). If a valid value designated by the index is 1 (29002), and a tag M value designated by the index is equal to the tag (29003), the cache is hit. If Yes in the process 29002 or No in the process 29003, a cache miss occurs, and the valid value and tag M value are updated (29004). In an actual system, data must be written (write back) to an external memory upon occurrence of a cache hit. In this case, such operation need not be simulated.

By executing the processes shown in FIGS. 22 to 24 for an instruction string, cache simulation can be done for an instruction at an address indicated by an execution trace. Simulation can also be done for a cache memory having a different scheme from that of the above memory.

The process result is output as the execution trace information B1 1006 shown in FIG. 2, and its contents include an instruction cache hit count 6002 and data cache hit count 6003 in addition to execution trace information A 6001, as shown in FIG. 17.

The section hit ratio simulation process 2006 shown in FIG. 25 when an interrupt is considered will be explained. As for a task of estimating the execution time, cache hit ratios shown in FIG. 2 when no interrupt is considered are respectively set for an instruction and data. The following estimating method can also be applied to an instruction and data cache.

Figure 26:
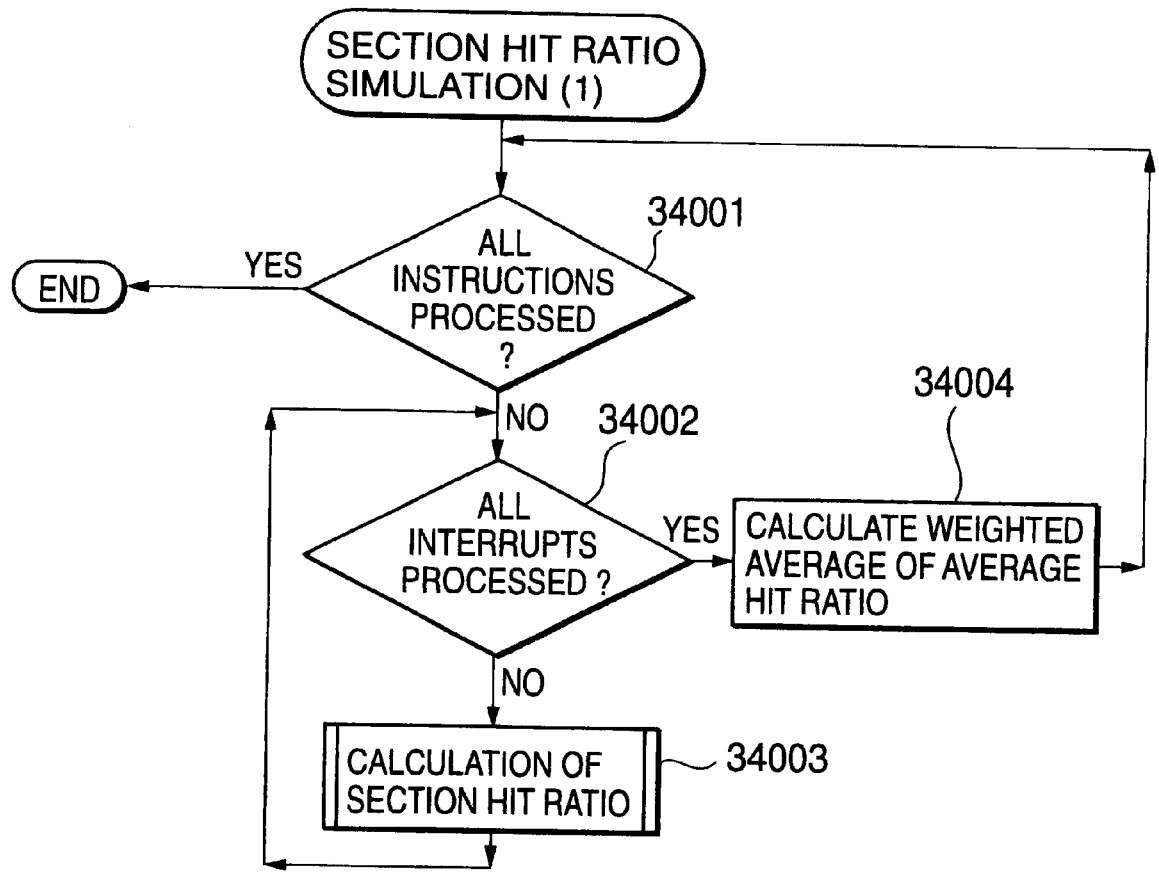
FIG. 26 is a flow chart showing the flow of a process of calculating the section hit ratio.
Figure 27:
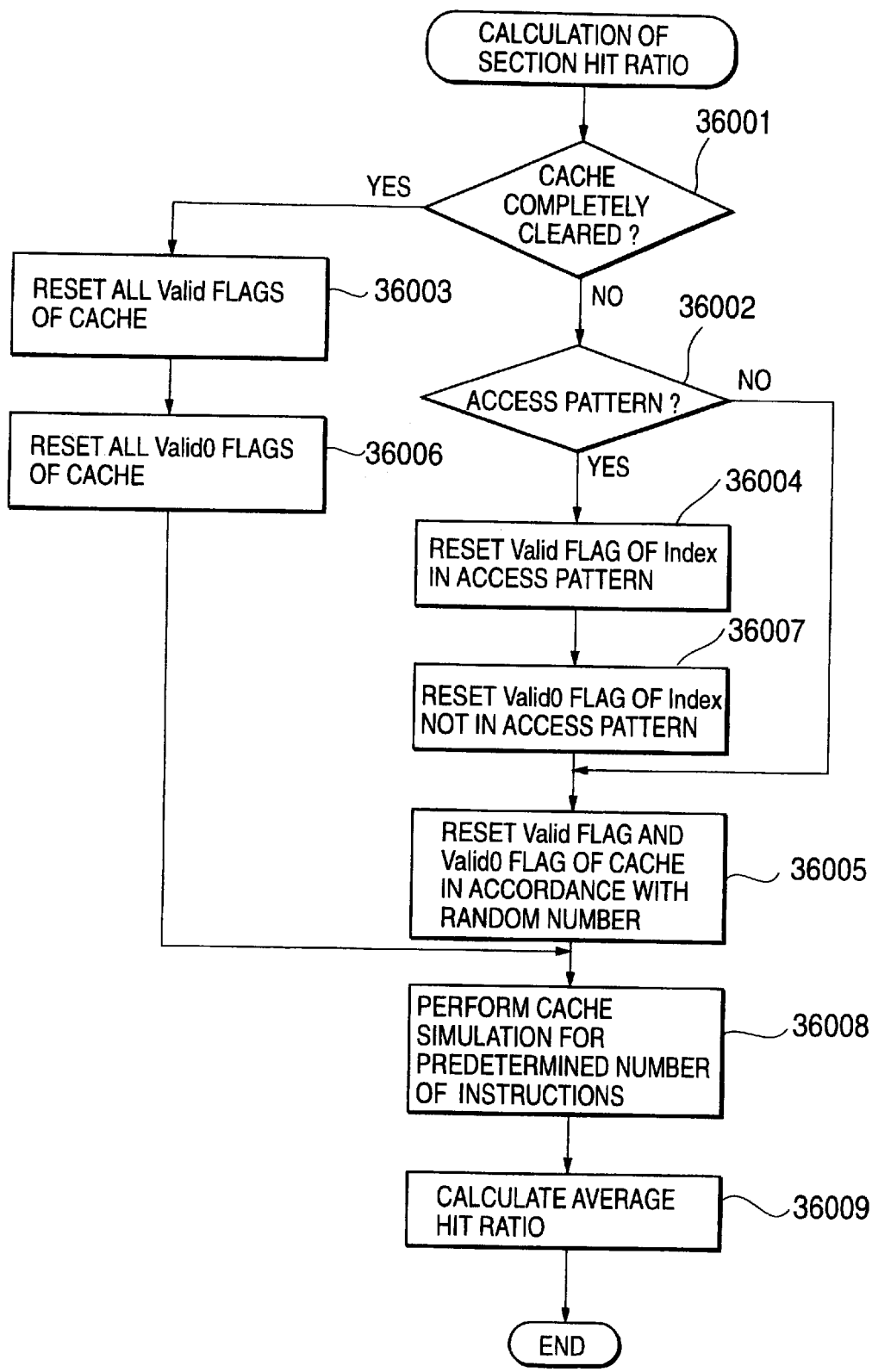
FIG. 27 is a flow chart showing the flow of the process of calculating the section hit ratio.

FIGS. 26 and 27 show the sequence of the section hit ratio simulation process 2006. This process calculates an average cache hit ratio on the assumption that an interrupt is generated at a predetermined probability in executing all the instructions in an execution trace. The section hit ratio simulation process 2006 is done for all the instructions of the execution trace in accordance with a sequence as shown in FIG. 26. When a specific instruction is extracted, and section hit ratio simulation is done for only the instruction, the section hit ratio simulation process 2006 follows a sequence shown in FIG. 40, similar to the second embodiment (to be described later).

More specifically, whether all the instructions in an execution trace are processed is checked as a process 34001, and whether section hit ratios are calculated for all the interrupts is checked as a process 34002. If No in the process 34002, a section hit ratio is calculated as a process 34003. If Yes in the process 34002, the weighted average between an average hit ratio when no interrupt is considered and a section hit ratio when an interrupt is considered is calculated as the cache hit ratio of a corresponding instruction as a process 34004.

The sequence of calculating the section hit ratio as the process 34003 is shown in FIG. 27. Whether the cache is completely cleared is checked as a process 36001. If No in the process 36001, whether an access pattern exists is checked as a process 36002. If Yes in the process 36002, the flow shifts to a next process 36004.

As the process 36004, the valid flag of an index in the access pattern is reset. The valid "0" flag of an index which does not exist in the access pattern is reset, and the flow shifts to a process 36005. If No in the process 36002, the flow directly shifts to the process 36005.

As the process 36005, the valid flag and valid "0" flag of the cache are reset in accordance with random numbers. If Yes in the process 36001, all the valid flags of the cache are reset as a process 36003, and all the valid "0" flags of the cache are reset as a process 36006. Then, the flow shifts to a process 36008.

As the process 36008, cache simulation is executed for a predetermined number of instructions. The average hit ratio is calculated as a process 36009.

The section hit ratio is calculated for the types of interrupt factors classified as shown in FIG. 28. An interrupt type 39001 includes A to E, and their generation probabilities 39002 are $2.0 \times 10^{-5}$, $1.5 \times 10^{-6}$, $2.0 \times 10^{-7}$, $2.0 \times 10^{-6}$, and $1.0 \times 10^{-7}$, respectively. Cache rewrite patterns 39003 are a 30%-clear pattern, pattern A, pattern B, 100%-clear pattern, and 80%-clear pattern, respectively. FIG. 29 shows the rewrite pattern A, and FIG. 30 shows the rewrite pattern B.

In general, the cache rewrite pattern changes depending on an interrupt process routine. For example, when the interrupt process is long, most of the instruction cache and data cache are rewritten. In this case, these caches can be considered to be cleared 100%, as shown as the interrupt type D in FIG. 28. The clear probability changes depending on the routine length and the like, which can be obtained by analyzing the interrupt routine in advance. The analysis for calculating the clear probability is achieved by the above-described instruction level simulation and cache simulation.

Figures 30, 31:
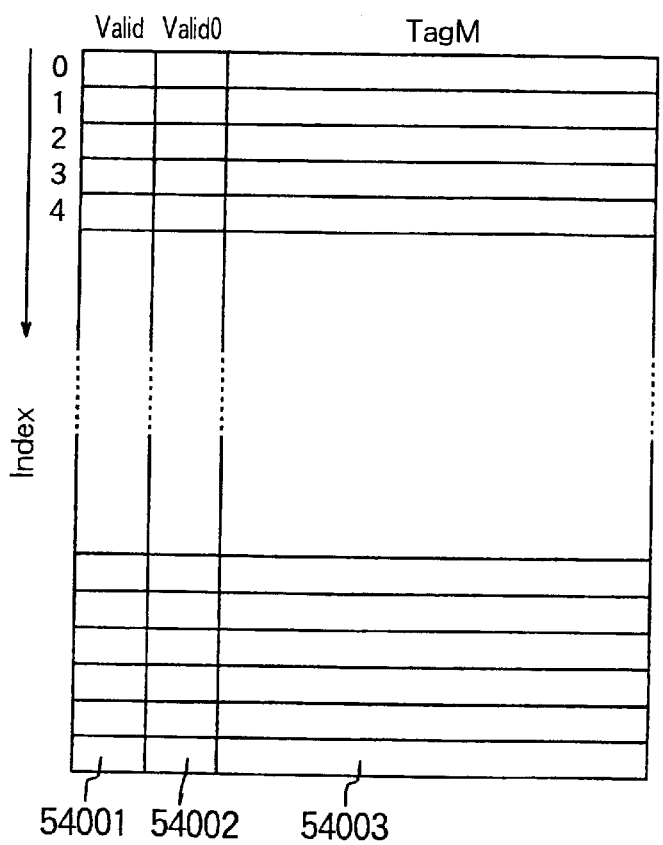
FIG. 30 is a table showing a cache rewrite pattern B in an interrupt.
FIG. 31 is an explanatory view showing a data structure for performing cache simulation in the process of calculating the section hit ratio.

Depending on the contents of a process routine, only a specific portion of the cache may be rewritten like the rewrite pattern A shown in FIG. 29 or the rewrite pattern B shown in FIG. 30. In this case, a rewrite pattern can be designated by listing the values of a rewrite index X, as shown in FIGS. 29 and 30.

The cache rewrite pattern can also be expressed by a combination of the interrupt types A and B shown in FIG. 28. This pattern is a rewrite pattern adopted in, e.g., a process using data at a specific address and a work area on the stack, and can be classified as the interrupt type C in FIG. 28.

A cache which is rewritten by cache rewrite patterns represented as the interrupt types A to D cannot be simulated using the cache data structure as shown in FIG. 21 and the cache access methods as shown in FIGS. 23 and 24. In this case, cache simulation must be performed using a cache data structure as shown in FIG. 31 and cache access methods as shown in FIGS. 32 and 33.

The data structure shown in FIG. 31 considers rewrite. This data structure includes valid data 54001, tag M 54003, and in addition valid 0 data 54002, similar to the data structure shown in FIG. 21. The valid 0 data 54002 is a flag which is set to "0" for an entry where no rewrite is done by an interrupt routine. This flag is set to process the cache as a hit cache even when the entry is accessed to rewrite the valid data 54001 and tag M 54003. By adding the valid 0 data 54002, the cache can be processed as a hit cache even if no tag is set at an entry other than a written entry.

Figure 32:
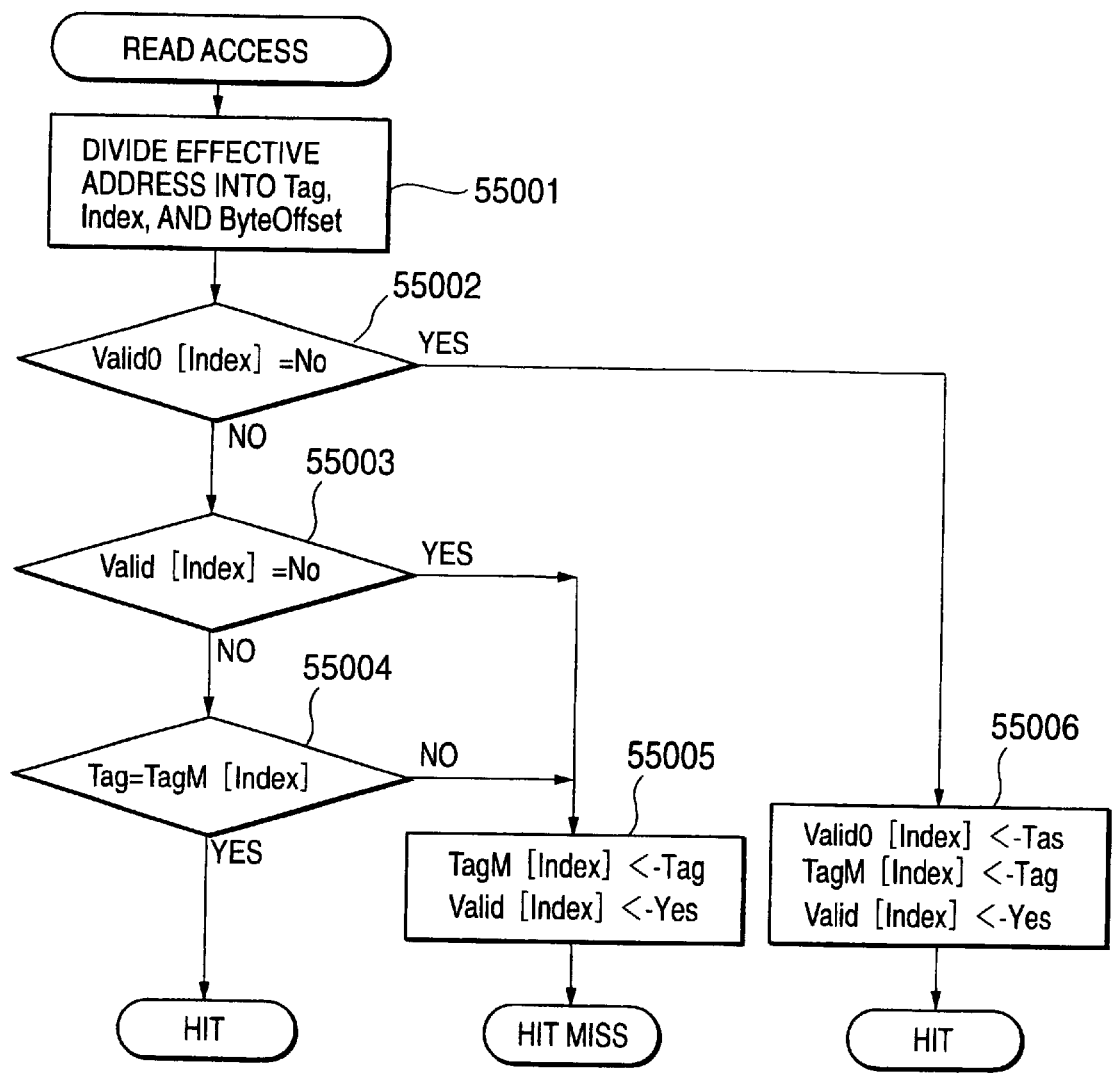
FIG. 32 is a flow chart showing the flow of a process of performing a cache read access in the process of calculating the section hit ratio.
Figure 33:
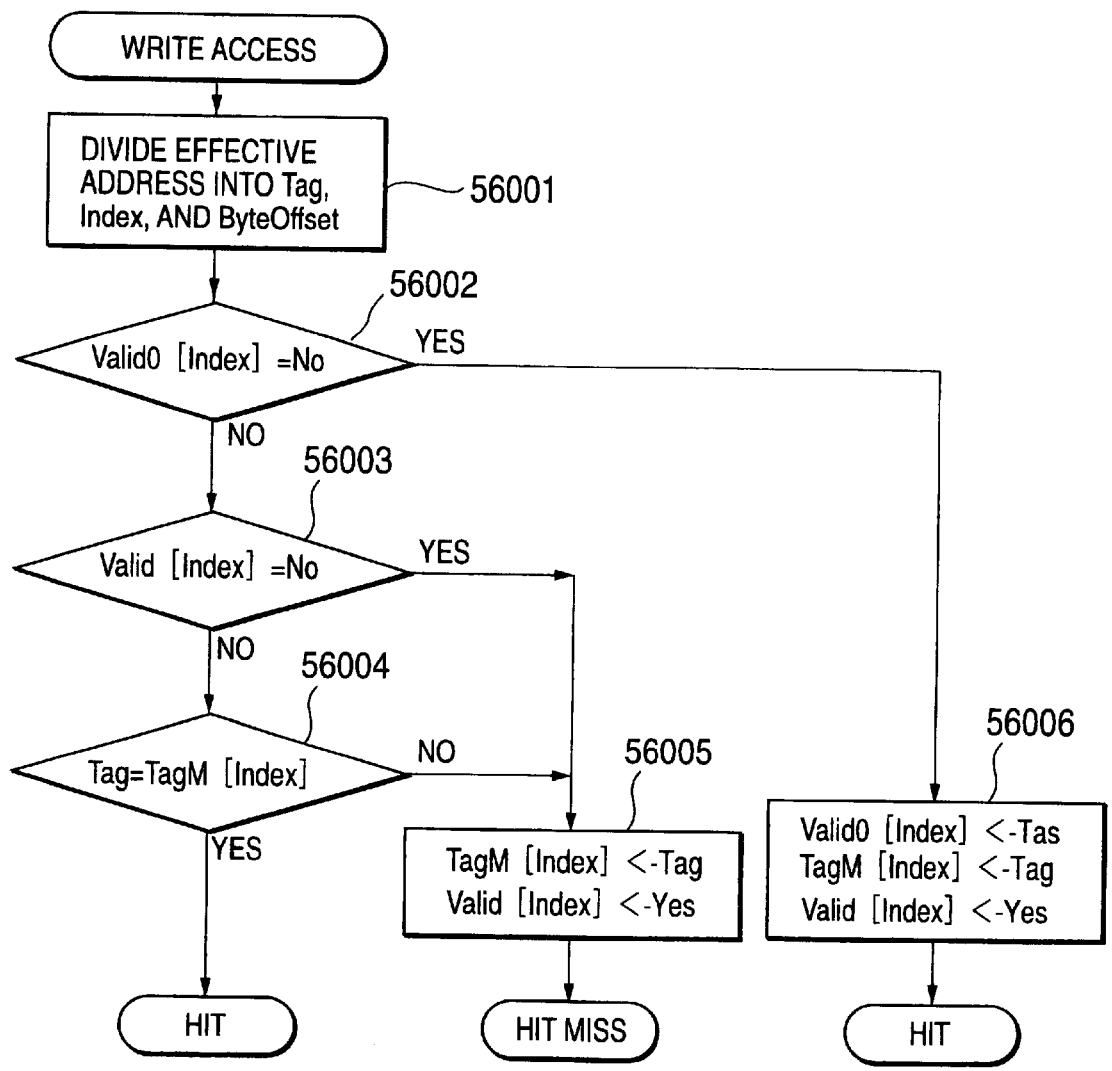
FIG. 33 is a flow chart showing the flow of a process of performing a cache write access in the process of calculating the section hit ratio.

The sequence of accessing a cache having this data structure is shown in FIGS. 32 and 33. FIG. 32 shows a read access process, and FIG. 33 shows a write access process. Processes 55001 to 55006 shown in FIG. 32 and the read access processes 28001 to 28004 shown in FIG. 23 that do not consider any interrupt are compared to find that the processes 55001 and 55003 to 55005 have the same contents as the processes 28001 to 28004. The processes 55002 and 55006 shown in FIG. 32 are newly added for the valid 0 flag. When the entry is rewritten for the valid 0 flag of "0", a hit is determined to occur. The valid 0 flag, which is accessed once, is "1" subsequently. In the second and subsequent accesses, the same processes as in the read access shown in FIG. 23 that does not consider any interrupt are performed.

Similar to the read access, processes 56001 and 56003 to 56005 among write access processes 56001 to 56006 are the same as the write access processes 29001 to 29004 shown in FIG. 24 that do not consider any interrupt. The processes 56002 and 56006 for the valid 0 flag are newly added.

The section hit ratio is calculated according to a sequence as shown in FIG. 27. In the processes 36003 to 36005, the valid flag is set to "0" for an entry which is rewritten in accordance with a cache rewrite pattern. In the processes 36005 to 36007, the valid 0 flag is set to "0" for an entry which is not rewritten. These processes substantially decrease the hit ratio.

As the process 36008, cache simulation is done for a predetermined number of instructions set in advance by experiments and the like. In this method, cache simulation is performed according to the sequences shown in FIGS. 22, 32, and 33, and the average cache hit ratio as the section hit ratio for these instructions is calculated as the process 36009.

In this manner, cache simulation in section hit ratio simulation can achieve a cache access process by the same sequence as in the case in which no interrupt is considered, except for the processes shown in FIGS. 22, 32, and 33.

The obtained section hit ratio simulation is output as the execution trace information B2 2007, as shown in FIG. 25. Similar to the case in which no interrupt is considered, the contents of the information B2 2007 include an instruction cache hit count 6002 and data cache hit count 6003 in addition to the execution trace A 6001, as shown in FIG. 17. In this case, the instruction cache hit count 6002 and data cache hit count 6003 are not integers but real numbers determined by the cache hit ratio, unlike the case in which no interrupt is considered.

Figure 34:
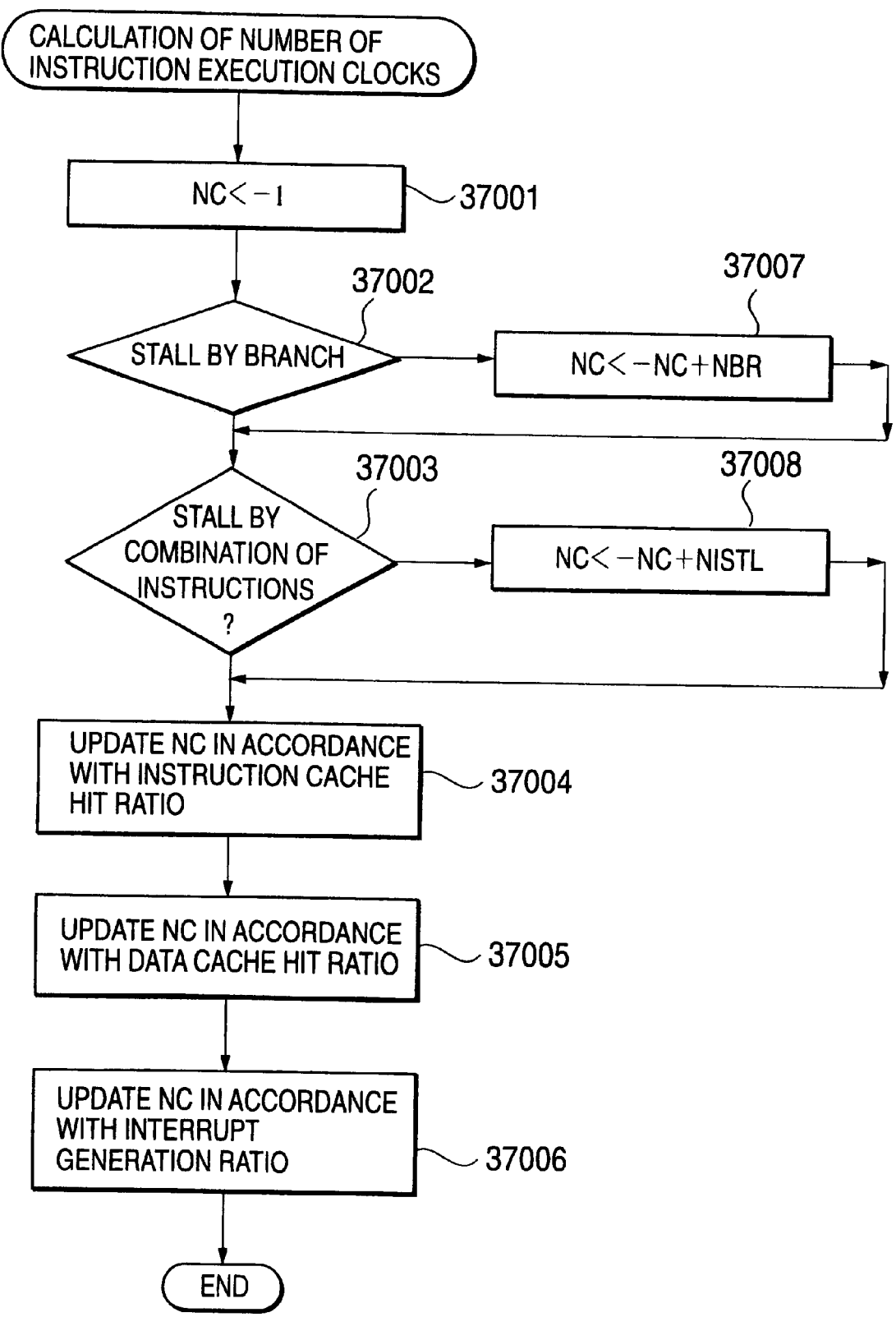
FIG. 34 is a flow chart showing the flow of a process of obtaining the number of execution clocks in simulation considering an interrupt.
Figure 37:
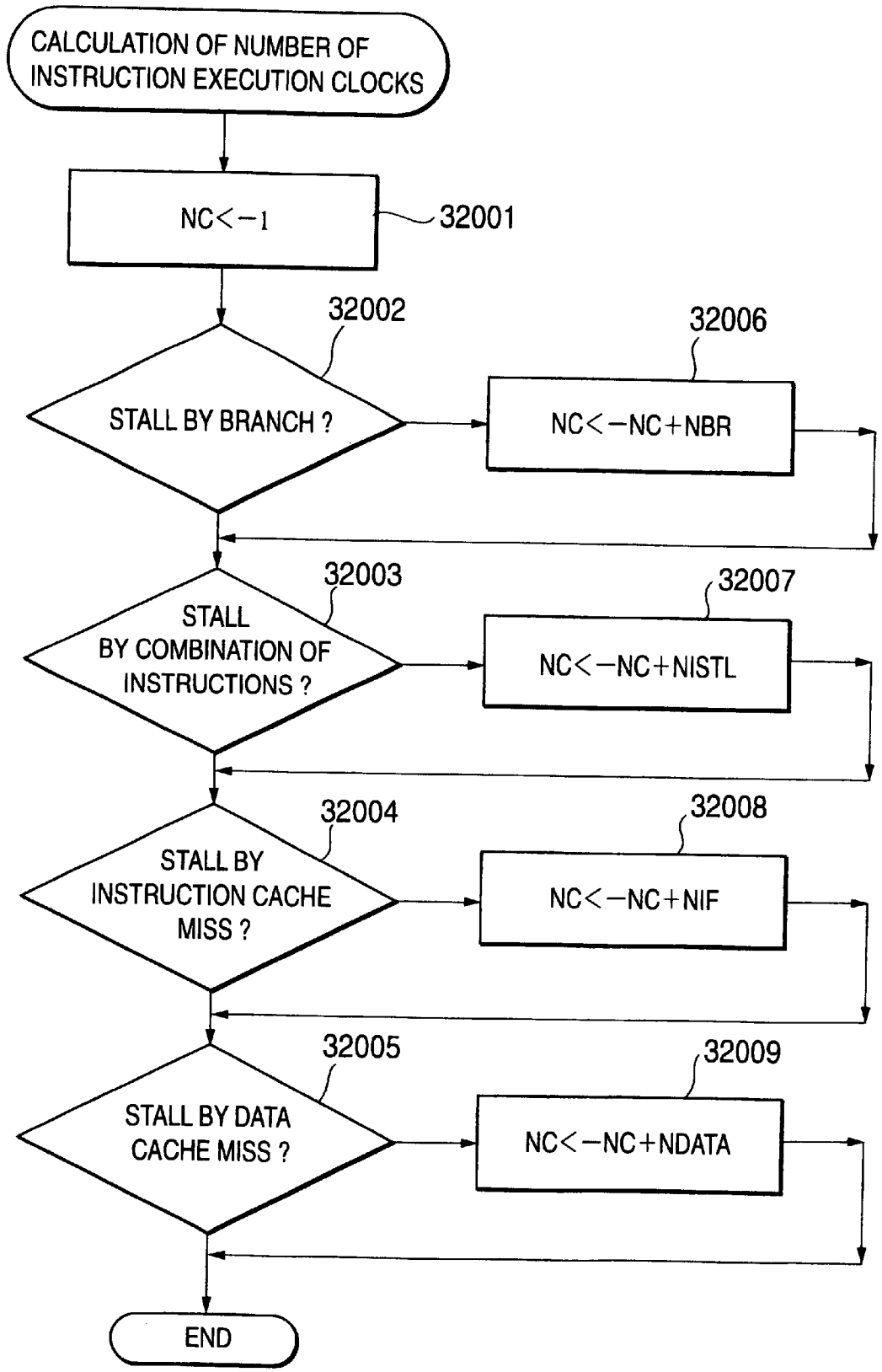
FIG. 37 is a flow chart showing the flow of a process of obtaining the number of execution clocks in simulation not considering any interrupt.

A process of obtaining the number of execution clocks will be described. In this process, the cache hit process is different between the process 1008 shown in FIG. 2 when no interrupt is considered, and the process 2009 shown in FIG. 25 when an interrupt is considered. FIG. 37 shows a process when no interrupt is considered, and FIG. 34 shows a process when an interrupt is considered.

When no interrupt is considered, the process is executed for CPU A having specifications as shown in FIG. 35A. In this CPU A, as shown in FIG. 36A, a penalty NBR of a pipeline stall caused by a branch is five clocks, a penalty NIF caused by an instruction cache miss is three clocks, a penalty NDATA caused by a data cache miss is three clocks, and no stall NISTL by a combination of instructions occurs. These penalties correspond to the stall penalty 1007 shown in FIG. 2.

Processes 32001 to 32009 shown in FIG. 37 are performed for CPU A having these specifications. A minimum number NC of clocks necessary for execution is set to 1 as the process 32001. Whether stalls by a branch, combination of instructions, instruction cache miss, and data cache miss occur is determined using information included in execution trace information as the processes 32002 to 32005. If stalls occur in the respective cases, the value NC is incremented by a value given as a stall penalty in the processes 32006 to 32009.

The value obtained by the processes 32001 to 32009 is added to the execution trace B1 1006 to attain execution trace C1 1009. This information includes information 7002 about the number of execution clocks for each instruction that is added to a content 7001 of the trace information B1 for each instruction, as shown in FIG. 18.

A process of obtaining the number of execution clocks when an interrupt is considered will be explained with reference to FIG. 34. The minimum number NC of clocks necessary for execution is set as a process 37001, a process for a stall caused by a branch is performed as processes 37002 and 37007, and a process for a stall caused by a combination of instructions is performed as processes 37003 and 37008. These processes are the same as the processes 32001, 32002, 32006, 32003, and 32007 shown in FIG. 37 when no interrupt is considered.

When an interrupt is considered, the cache memory hit ratio is represented by a real number. As for an instruction cache miss and data cache miss, the number of clocks as a penalty is calculated based on the cache hit ratio in processes 37004 and 37005. In this calculation, the penalty NIF caused by an instruction cache miss, and the product of the penalty NDATA caused by a data cache miss and the cache miss probability are added to the number NC of clocks.

Upon occurrence of an interrupt, a pipeline stall necessarily occurs. For this reason, the product of the interrupt generation ratio and the stall penalty must be added as the process 37005. The value of the stall penalty upon an interrupt is assumed to be the same as the value of the branch penalty. However, the values of the stall and branch penalties may be different depending on the specifications of the CPU. In this case, the above value is set in the stall penalty 2008 in advance.

The stall penalty 2008 obtained by this process is added to the execution trace B2 2007 to attain the execution trace information C2 2010 as shown in FIG. 25. Similar to the case in which no interrupt is considered, the information C2 2010 includes the information 7002 about the number of execution clocks for each instruction added to the content 7001 of the trace information B2 for each instruction. In this case, the number of execution clocks is a real number, unlike information not considering any interrupt.

Figure 38:
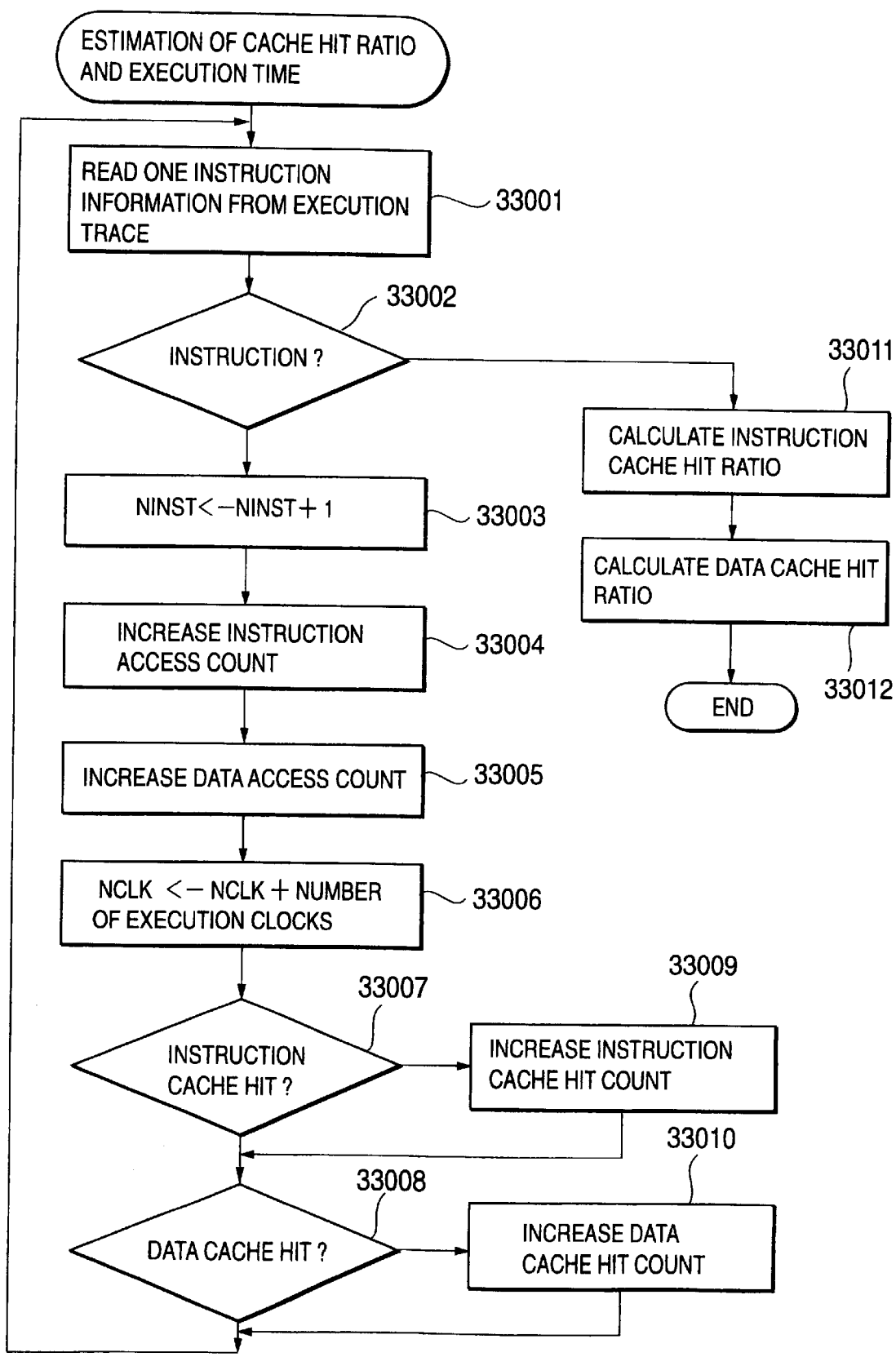
FIG. 38 is a flow chart showing the flow of a process of estimating the cache hit ratio and execution time in simulation not considering any interrupt.
Figure 39:
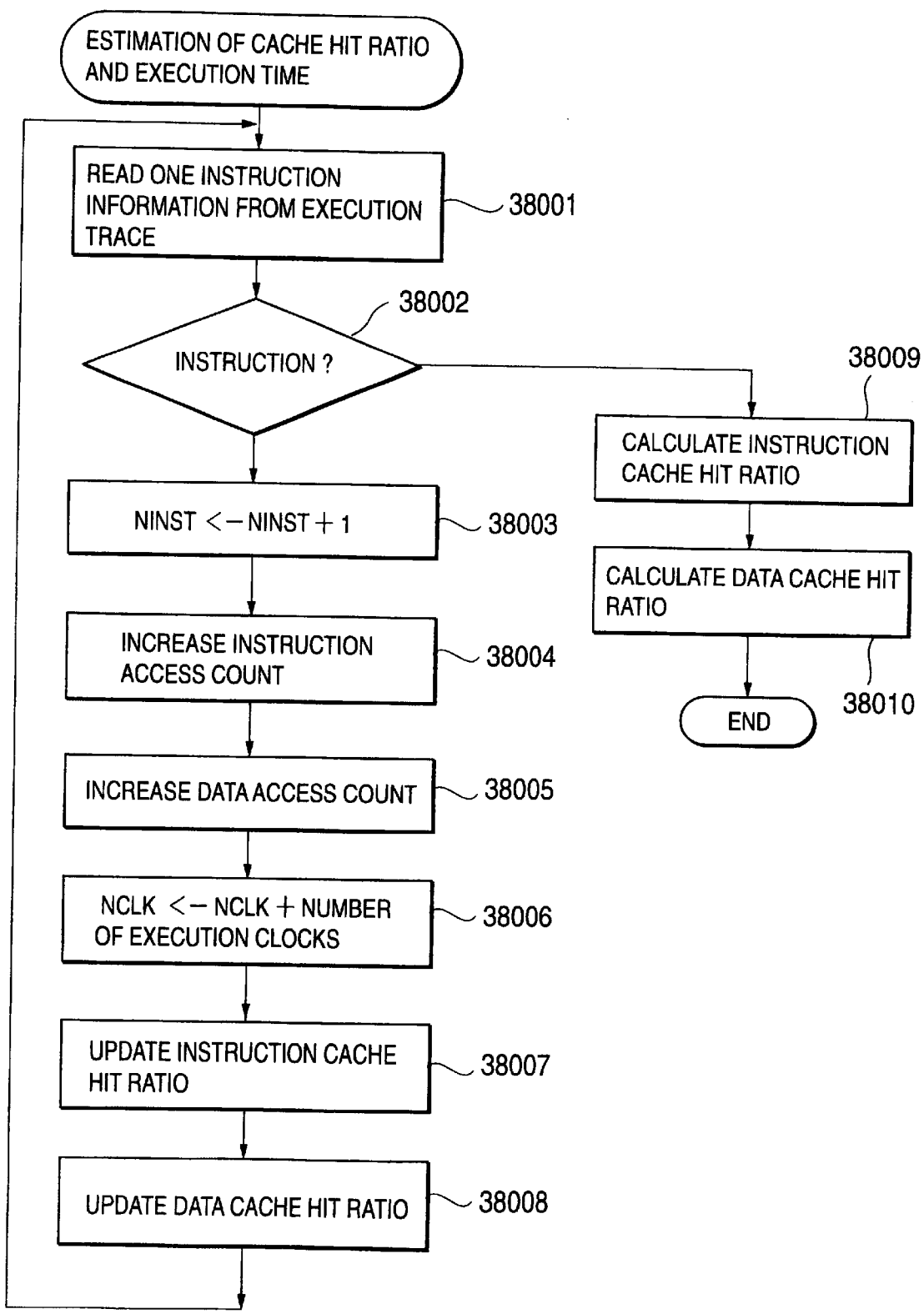
FIG. 39 is a flow chart showing the flow of a process of estimating the cache hit ratio and execution time in simulation considering an interrupt.

A process of estimating the cache hit ratio and execution time is different between the process 2011 considering an interrupt and the process 1010 not considering any interrupt. FIG. 39 shows the contents of the process 2011 considering an interrupt, and FIG. 38 shows the contents of the process 1010 not considering any interrupt. The processes 2011 and 1010 are different in that cache hits in each instruction are represented by the number or probability of hits.

The process 1010 not considering any interrupt proceeds a subsequent process every time one instruction information is read from an execution trace, as a process 33001 shown in FIG. 38. The number of instructions is incremented by one as a process 33003, and the instruction access count is incremented in accordance with the execution trace as a process 33004. The data access count is incremented as a process 33005, and the number of execution clocks is incremented as a process 33006.

Whether an instruction cache is hit is checked as a process 33007. If the instruction cache is hit, the instruction cache hit count is updated as a process 33009. Whether a data cache is hit is checked as a process 33008. If the data cache is hit, the data cache hit count is updated as a process 33010. The processes 33001 to 33010 are performed for all instructions. As a process 33011, an instruction cache ratio is calculated as the ratio of the instruction cache hit count to the instruction access count. As a process 33012, a data cache ratio is calculated as the ratio of the data cache hit count to the data activation count. Then, the flow ends. The calculated values are output as estimation results 1011.

A process considering an interrupt will be explained with reference to FIG. 39. This process is the same as the process shown in FIG. 38 that does not consider any interrupt, except that the number of execution clocks, the instruction cache hit count, and the data cache hit count are real numbers. That is, processes 38001 to 38005 shown in FIG. 39 are the same as the processes 33001 to 33005 shown in FIG. 38, and obtain the number of instructions, the instruction access count, and the data access count in the same way.

However, unlike the process 33006 in FIG. 38, the number of execution clocks in a process 38006 of FIG. 39 is a real number, and thus the calculation result is expressed by a real number. Further, unlike the process 33009 in FIG. 38, calculation of the instruction cache hit ratio in a process 38007 shown in FIG. 39 considers a cache hit ratio for an instruction with respect to the instruction access count, and the product of the instruction access count and the cache hit ratio is added. Moreover, unlike the process 33010 in FIG. 38, a process 38008 in FIG. 39 considers a cache hit ratio for an instruction with respect to the data access count, and the product of the data access count and the cache hit ratio is added.

Similar to the processes 33011 and 33012 shown in FIG. 38, a process 38009 shown in FIG. 39 calculates an instruction cache hit ratio as the ratio of the instruction cache hit count to the instruction access count, and a process 38010 calculates a data cache hit ratio as the ratio of the data cache hit count to the data access count. The calculated values are output as estimation results 2012.

The first embodiment of the present invention using a combination of the estimating method shown in FIG. 2 that does not consider any interrupt, and the estimating method shown in FIG. 25 that considers an interrupt will be explained with reference to FIG. 1.

The program & initial data value & execution start address & execution end address data 1001 is input to the instruction level simulation 1002 to output the program execution trace information A 1003.

The execution trace information A 1003 output from the instruction level simulation 1002, and the cache scheme & cache size data 1004 are input to the cache simulation 1005 to output the execution trace information B1 1006.

The trace information B1 1006 and stall penalty information 1007 are input to perform the process 1008 of obtaining the number of execution clocks for each instruction, thereby outputting the execution trace information C1 1009.

The execution trace information C1 1009 is input to perform the process 1010 of estimating the cache hit ratio and execution time of the whole task, thereby outputting the estimation result 1011.

The obtained estimation result 1011, execution trace information A 1003, cache scheme & cache size data 2004, and interrupt probability data 2005 are input to perform a section hit ratio simulation process 2006a, thereby outputting execution trace information D 2007a including a cache hit ratio for each instruction.

The output execution trace information D 2007a and the stall penalty information 2008 are input to obtain the number of execution clocks for each instruction, thereby outputting execution trace information E 2010a. Using the execution trace information E 2010a, a process 2011a of estimating the cache hit ratio and execution time is done to output an estimation result 2012a.

According to the first embodiment, a cache hit ratio and execution time considering an interrupt can be obtained from a cache hit ratio and execution time not considering any task interrupt on the basis of the interrupt profile.

In the first embodiment, the cache hit ratio considering an interrupt is performed for all the executed instructions. However, this requires a very long process time because the cache simulation process is repeated for each instruction by a number of times determined by the types of interrupts for a number of instructions enough to stabilize the hit ratio. The second embodiment capable of shortening the process time will be explained.

In the first embodiment, an interrupt is assumed to be generated in all instructions at a designated probability. In general, however, the interrupt generation probability is very low. For example, when an interrupt occurs every 2 msec for a CPU having a clock frequency of 50 MHz, the interrupt generation probability is $$(1/50*10^6)/2*10^{-3}=1*10^{-5} \quad (1)$$

In the second embodiment, no average hit ratio is calculated for all the types of interrupts in each instruction, but a number of interrupts proportional to the interrupt generation ratio are sampled from all execution sections to calculate the average hit ratio for the instruction.

Figure 54:
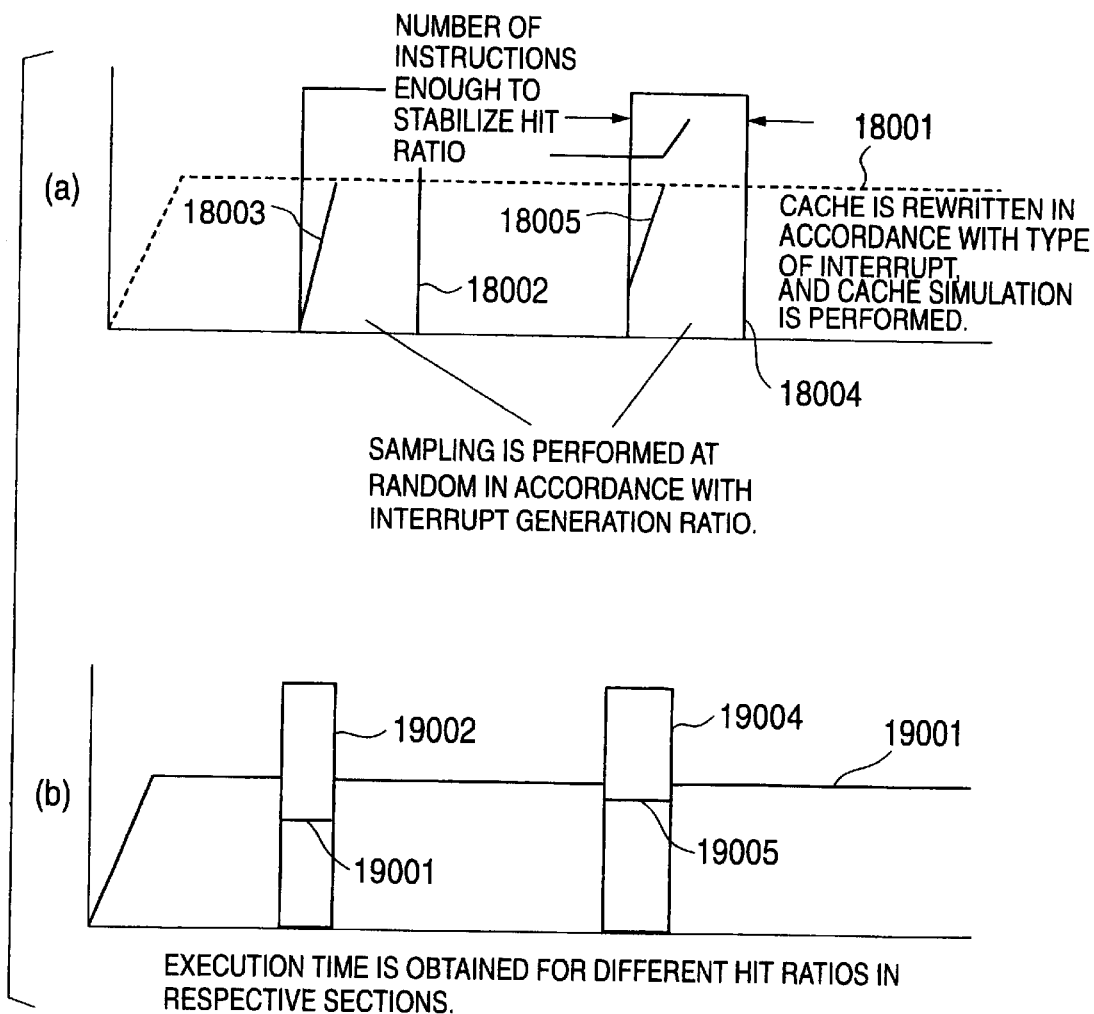
FIGS. 54A and 54B are explanatory views showing estimation of the cache hit ratio in the second embodiment of the present invention.

FIGS. 54A and 54B show the principle of a process considering an interrupt. In FIG. 54A, a hit ratio 18001 is an average cache hit ratio not considering any interrupt, sections 18002 and 18004 are simulation sections in which the hit ratio stabilizes, and hit ratios 18003 and 18005 represent hit ratio transitions within the sections 18002 and 18004. FIG. 54B shows a state in which average cache hit ratios 19003 and 19005 in sections 19002 and 19004 are obtained as a result of section simulation.

The hit ratio and execution time of the whole process are estimated on the assumption that the section hit ratios 19003 and 19005 are maintained in given sections. Hence, the second embodiment can obtain the value at a higher speed than in the first embodiment.

An estimating method according to the second embodiment of the present invention in which the average cache hit ratio and execution time are estimated in consideration of an interrupt on the basis of this principle will be explained. This method is the same as the first embodiment except for the section simulation process and the process of obtaining the number of execution clocks.

An instruction for executing section simulation is sampled. In this case, assume that generation probabilities for all interrupts are calculated in advance, and estimation not considering any interrupt has already been done.

The number of sampling points must be proportional to the interrupt generation ratio. Letting Pi be the generation ratio of a given interrupt, N be the total number of execution instructions, and Si be the number of sampling points, a number Si of sampling points is N*Pi.

Sampling points suffice to be uniformly distributed over all execution times. Thus, sampling points are extracted at an equal interval or using random numbers. Let NC be the total number of execution clocks. When sampling points are extracted at an equal interval, an interval Ki is Ki=NC/Si. When sampling points are extracted using random numbers, SP=NC*RAND is repeated by the number of instructions to be sampled using a function RAND of generating uniform random numbers, e.g., from 0 to 1. In this case, SP represents the number of clocks from the start of execution.

Figure 40:
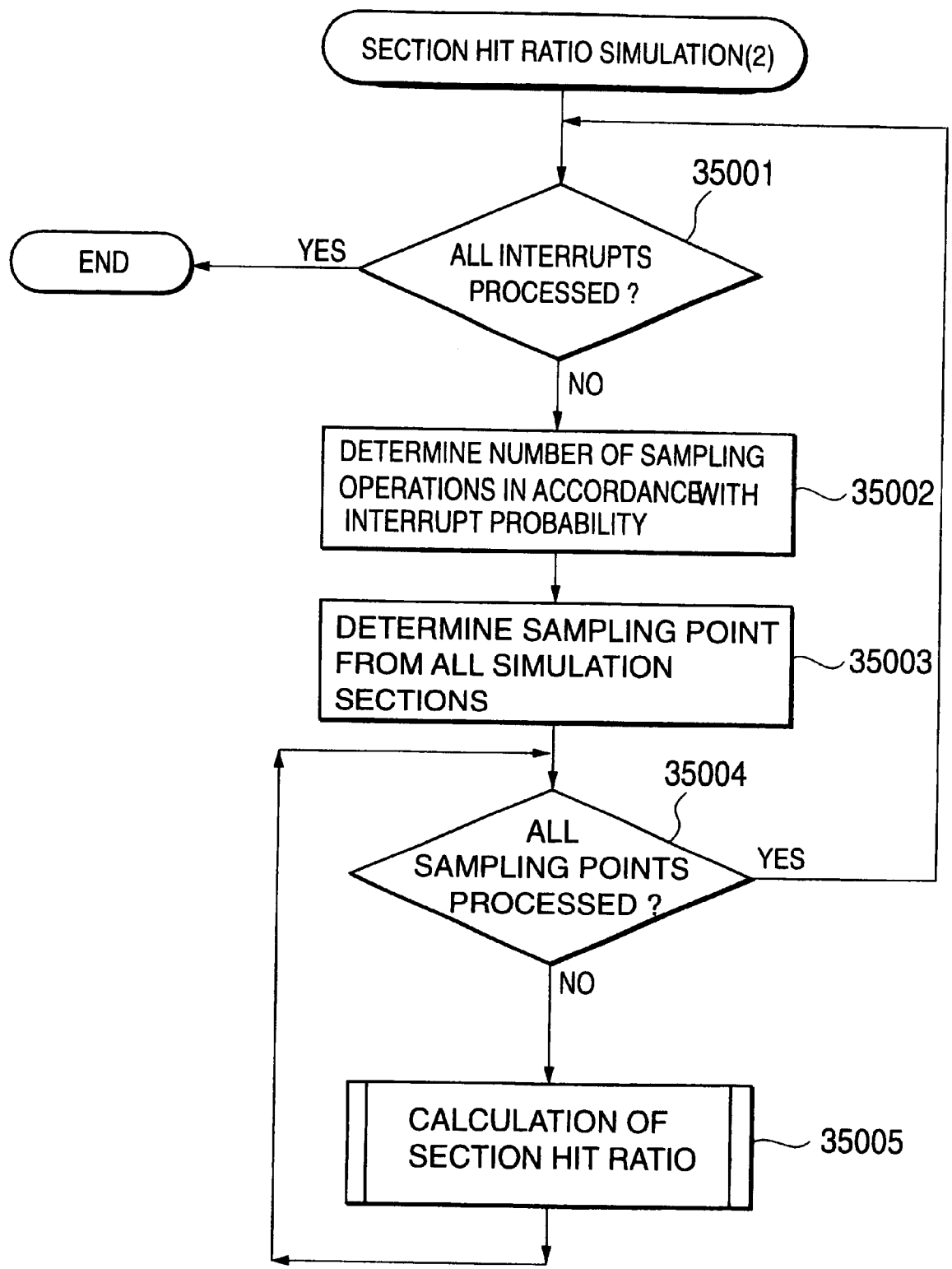
FIG. 40 is a flow chart showing the flow of a process of calculating the section hit ratio in a task execution time estimating method according to the second embodiment of the present invention.

After sampling points are determined, a process of calculating the section hit ratio is performed according to a sequence as shown in FIG. 40, similar to the first embodiment. The number of sampling operations is determined in accordance with the interrupt probability as a process 35002, and sampling points are determined from all simulation sections as a process 35003. Section hit ratios are calculated for all the sampling points as processes 35004 and 35005. The section hit ratios are calculated according to the method shown in FIG. 27. The processes 35002 to 35005 are repeated for all the types of interrupts, as shown as a process 35001. Accordingly, the section hit ratio is obtained.

The obtained section hit ratio is output as trace information D 2007a, similar to the first embodiment. However, unlike the first embodiment, information 8001 in FIG. 19 is made up of pieces of information 6001 to 6003 shown in FIG. 17, and flag information 8002 representing the sampling point and information 8003 representing the section length are added to the information 8001, as shown in FIG. 19. The section hit ratio is output to only an instruction at a sampling point.

Figure 41:
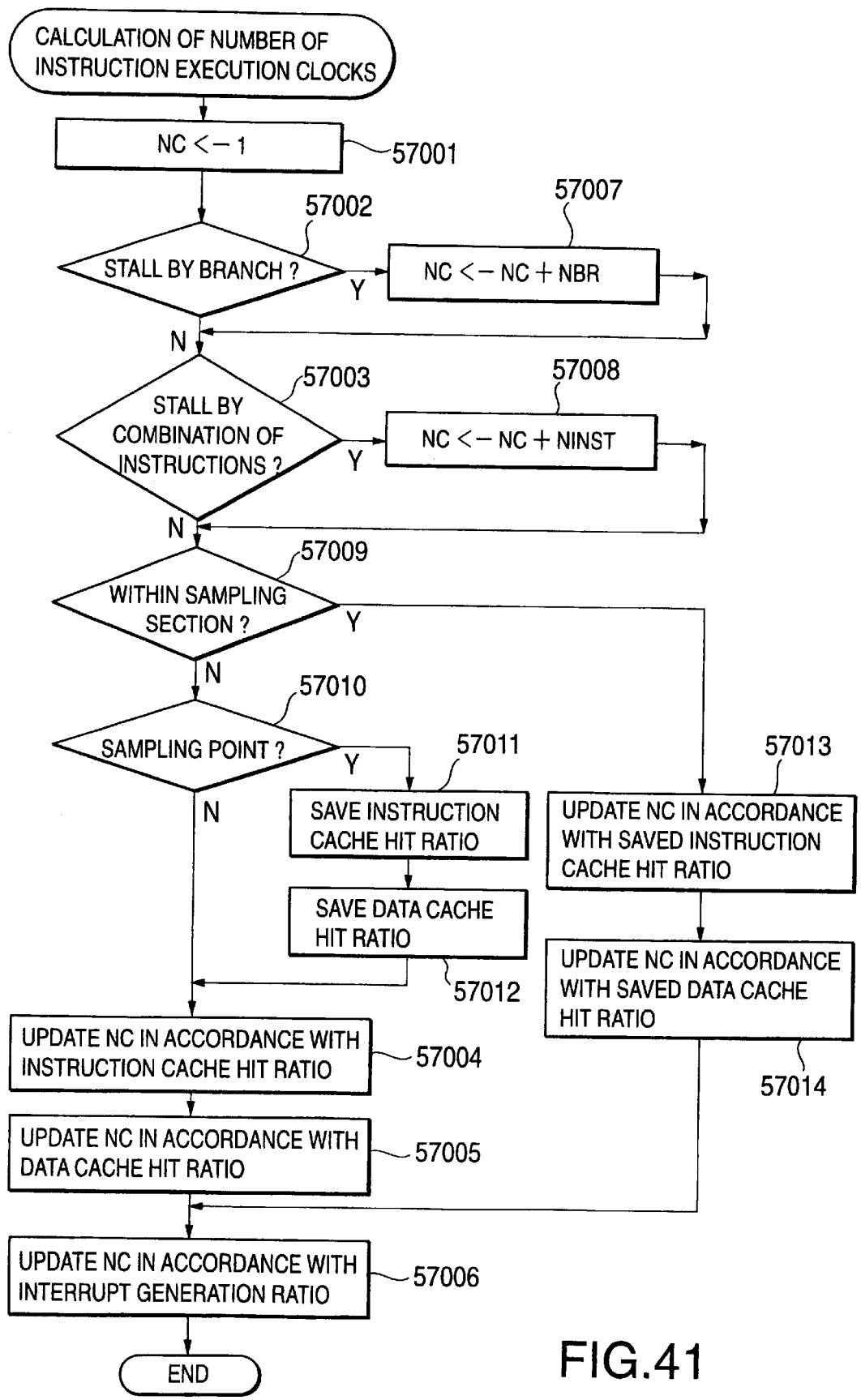
FIG. 41 is a flow chart showing the flow of a process of obtaining the number of execution clocks in the task execution time estimating method according to the second embodiment.

A process of obtaining the number of execution clocks is shown in FIG. 41. The minimum number NC of clocks necessary for the process is set as a process 57001, a process for a stall caused by a branch is performed as processes 57002 and 57007, a process for a stall caused by a combination of instructions is performed as processes 57003 and 57008, and a process for a stall caused by generation of an interrupt is performed as a process 57006. These processes are the same as the processes 37001, 37002, 37006, 37007, 37003, and 37008 shown in FIG. 34.

However, unlike the processes shown in FIG. 34, an instruction to be processed is at a sampling point, as shown as a process 57010. The instruction cache hit ratio is saved as a process 57011, and the data cache hit ratio is saved as a process 57012. For an instruction within the sampling section shown as a process 57009, the number NC of execution clocks is obtained using the saved instruction cache ratio as a process 57013, and the number NC of execution clocks is obtained using the saved data cache ratio as a process 57014. The value obtained by these processes is added to execution trace information B2 2007 to attain execution trace information C2 2010.

Figure 42:
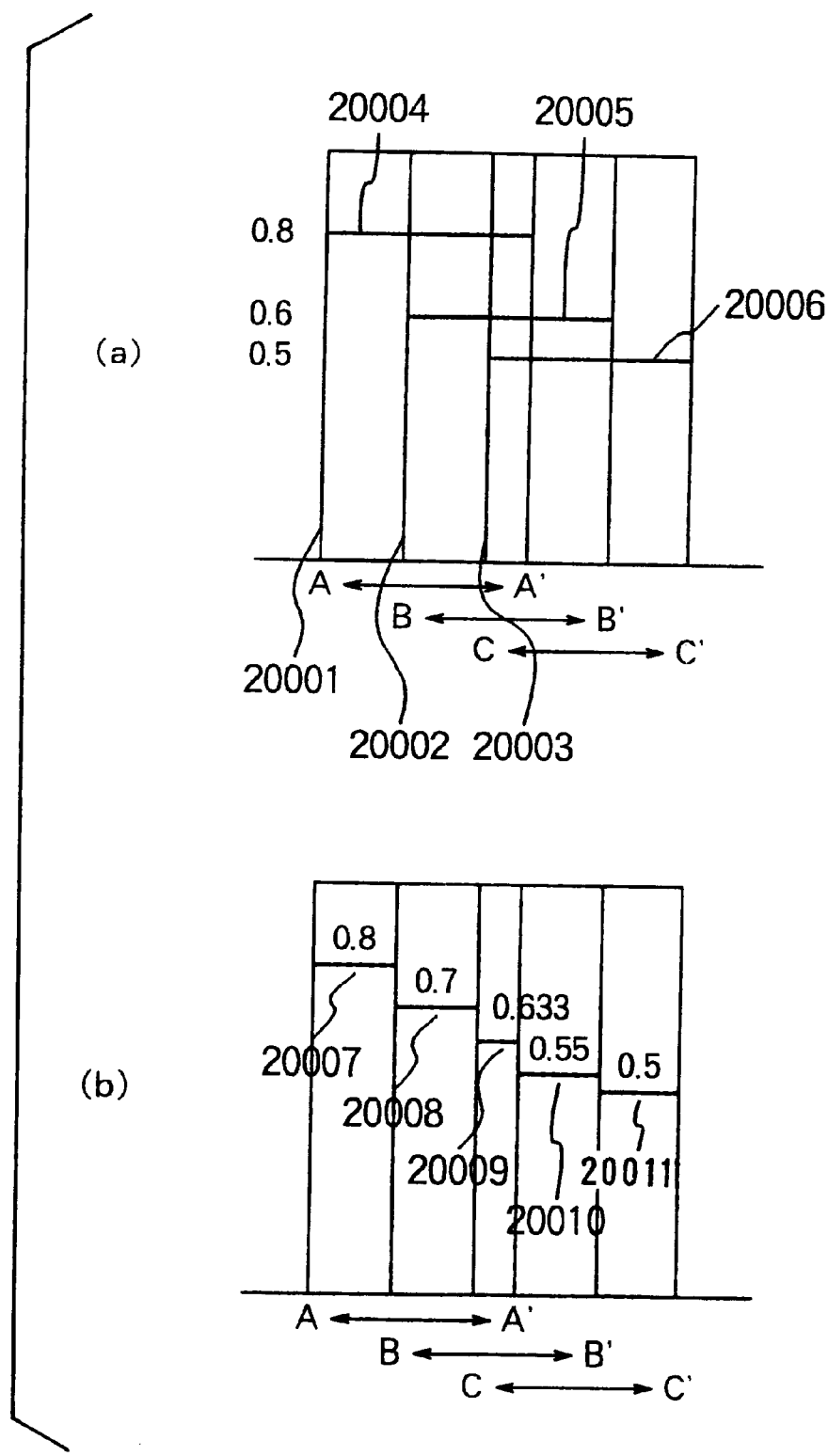
FIGS. 42A and 42B are explanatory views showing a process when sections in which the influence of an interrupt should be considered overlap each other in a task execution time estimating method according to the third embodiment of the present invention.

If sampling sections overlap each other, the cache hit ratio must be corrected in advance. For example, three sections 20001 to 20003 shown in FIG. 42A partially overlap each other. In this case, the averages of average cache hit ratios 20004 to 20006 in the respective sections are calculated in overlapping sections. As a result, as shown in FIG. 42B, the three sections 20001 to 20003 are divided into five sections 20007 to 20011. The average cache hit ratios in the overlapping sections 20008 to 20010 are the averages of the hit ratios in the overlapping sections. A process after obtaining the number of execution clocks is the same as in the first embodiment.

The task execution time and cache hit ratio estimated by the first or second embodiment are calculated for a specific CPU. Alternatively, task execution times and cache hit ratios may be calculated and compared between a plurality of CPUs having different cache sizes/cache schemes shown in FIGS. 35A to 35C.

Figure 43:
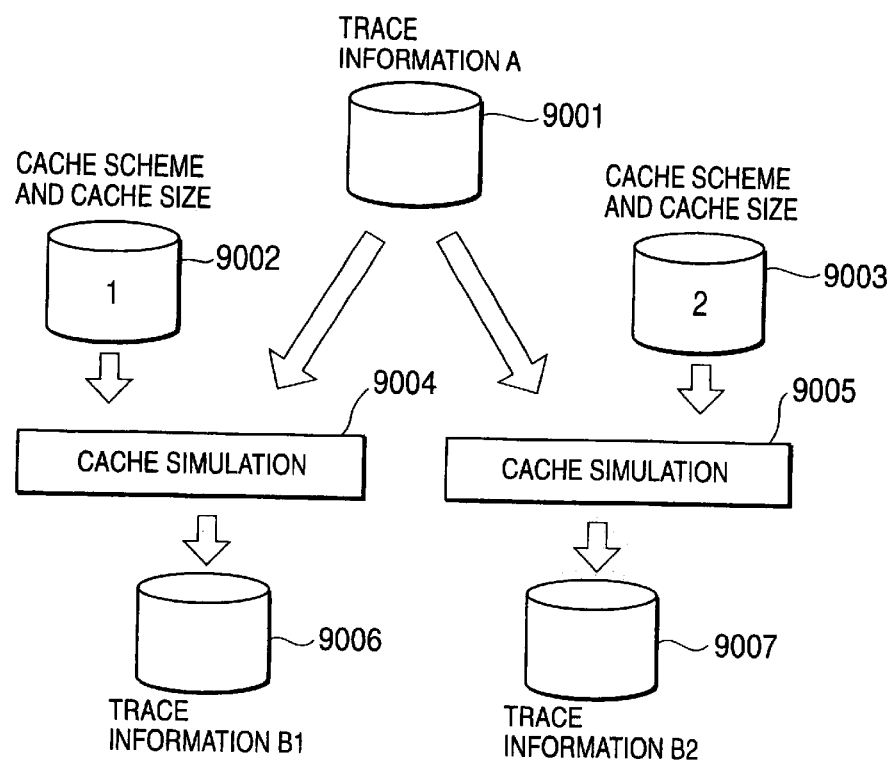
FIG. 43 is a flow chart showing a process of comparing CPUs having different cache sizes and cache schemes in the task execution time estimating method according to the third embodiment.
Figure 44:
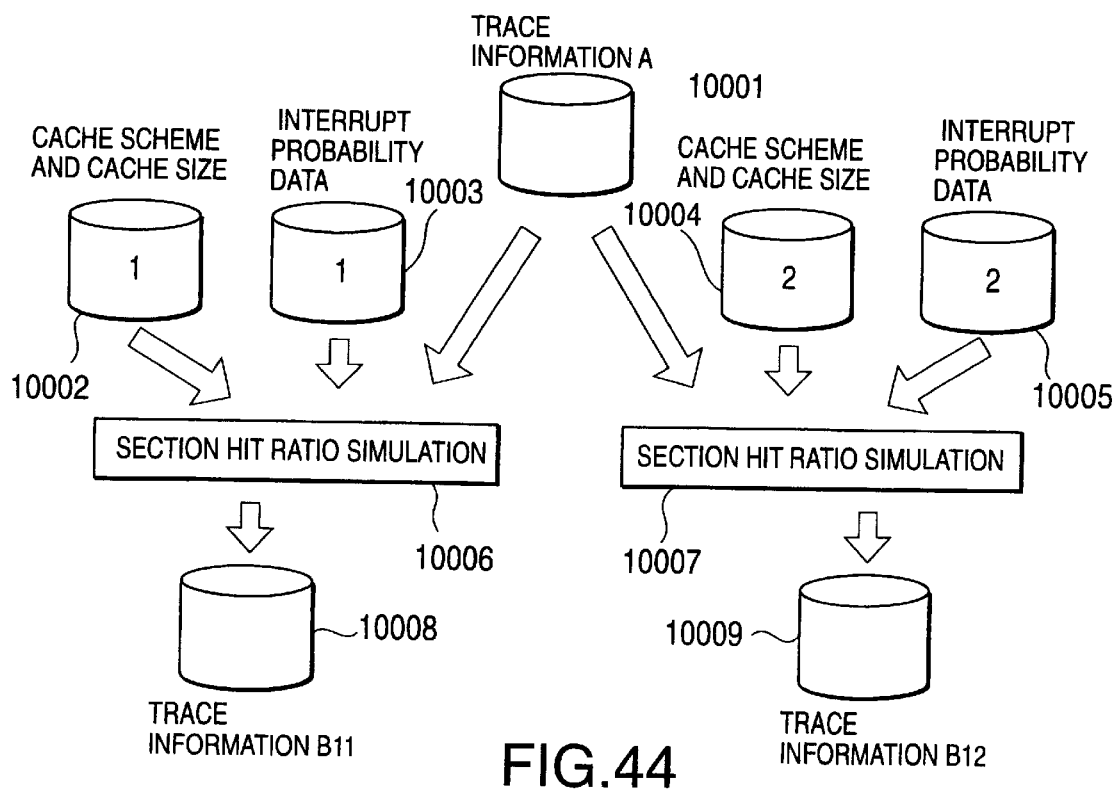
FIG. 44 is a flow chart showing the process of comparing CPUs having different cache sizes and cache schemes in the task execution time estimating method according to the third embodiment.
Figure 45:
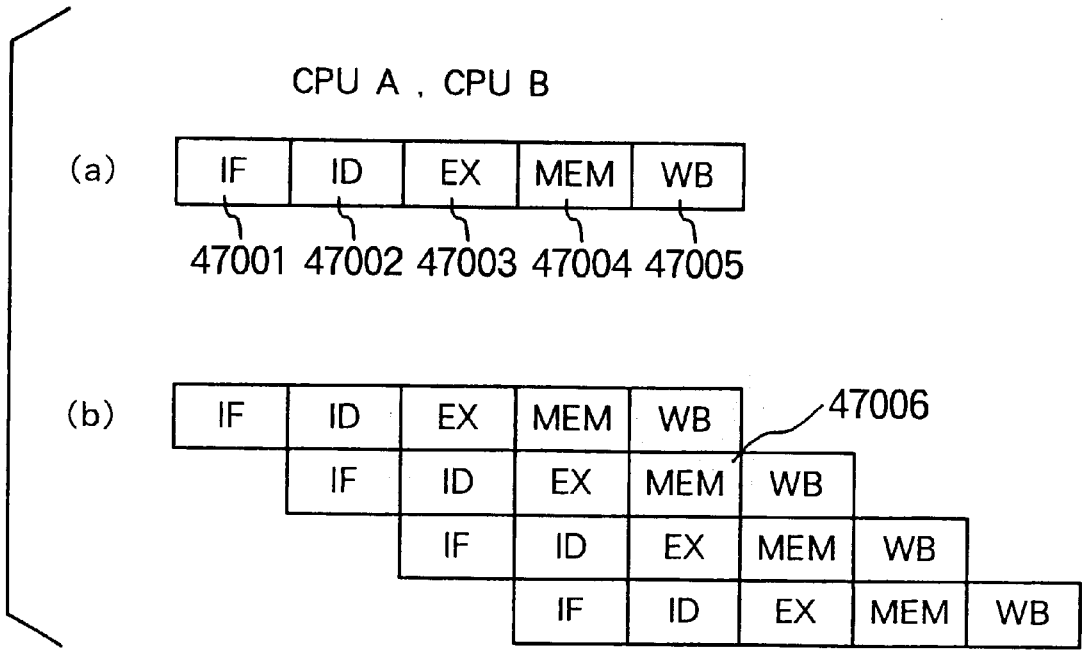
FIGS. 45A and 45B are explanatory views showing the pipeline stages.
Figure 46:
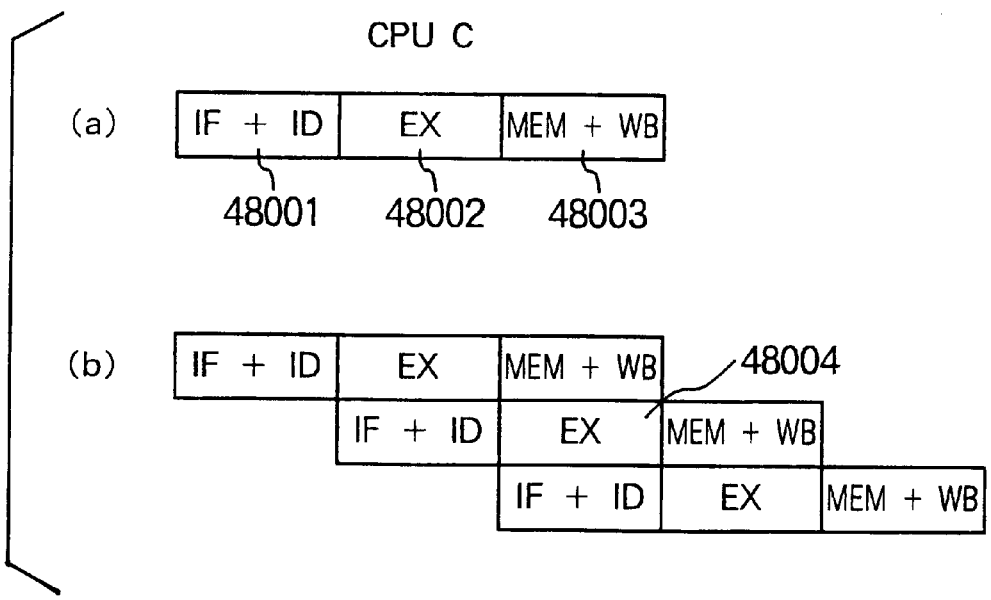
FIGS. 46A and 46B are explanatory views each showing the pipeline stage of CPU C.

The third embodiment of the present invention for performing this comparison process will be explained. FIGS. 43 and 44 show a sequence for performing the comparison process in the third embodiment. FIG. 43 shows a case in which CPUs are compared by estimation not considering any interrupt, and FIG. 44 shows a case in which CPUs are compared by estimation considering an interrupt. In FIG. 43, a cache simulation process 9004 is done using common execution trace information A 9001 and cache size/cache scheme information 9002 for the first CPU. Similarly, a cache simulation process 9005 is done using the common execution trace information A 9001 and cache size/cache scheme information 9003 for the second CPU. The pieces of information obtained by these processes are output as trace information B1 9006 and trace information B2 9007.

The subsequent process is done for the two pieces of trace information B 9006 and 9007. This enables comparing task execution times and cache hit ratios not considering any interrupt between the first and second CPUs of different cache sizes/cache schemes.

In the same fashion, task execution times and cache hit ratios considering an interrupt can be compared. The process considering an interrupt is shown in FIG. 44. A section hit simulation process 10006 is performed using a common execution trace A 10001, cache size/cache scheme information 10002 for the first CPU, and interrupt probability data 10003. A section hit simulation process 10007 is performed using the common execution trace A 10001, cache size/cache scheme information 10004 for the second CPU, and interrupt probability data 10005. As a result of these processes, trace information B11 10008 and trace information B12 10009 are obtained. If interrupt profiles are the same, the interrupt probability data 10003 and 10005 are the same.

The subsequent process, which is the same as the process shown in FIG. 43 that does not consider any interrupt, is done for the two pieces of trace information B 10008 and 10009. This enables comparing task execution times and cache hit ratios considering an interrupt between the first and second CPUs of different cache sizes/cache schemes.

These processes can also be done for, e.g., four types of cache sizes. As shown in FIGS. 53A, 53B, and 53C, the cache hit ratio, execution time, and area are plotted on graphs. Data about the first cache size includes a hit ratio 58001, execution time 59001, and area 60001. Data about the second cache size includes a hit ratio 58002, execution time 59002, and area 60002. Data about the third cache size includes a hit ratio 58003, execution time 59003, and area 60003. Data about the fourth cache size includes a hit ratio 58004, execution time 59004, and area 60004.

By creating such graph for all the tasks executed on the system, a CPU having an optimum cache size and cache scheme can be selected.

In the process method of the third embodiment, CPUs of different cache sizes/cache schemes are compared to select an optimum CPU. To the contrary, an estimating method when hardware except for the CPU is changed or a task other than a task to be estimated is changed or processed as hardware will be described as the fourth embodiment.

When such change occurs, a target task must be corrected in some cases. In the fourth embodiment, however, the task is assumed to be kept unchanged. At this time, the interrupt profile changes, which influences the target task. For this reason, estimation not considering any interrupt is executed by the method shown in FIG. 2, then estimation considering an interrupt shown in FIG. 25 is executed for a changed interrupt profile corresponding to a changed portion, and the estimation results are compared.

This method can estimate the influence of an task not to be estimated on a task to be estimated. By performing this processing for all the tasks executed on the system, the system can be optimized.

According to the estimating method of the fourth embodiment, CPUs which are identical except for different cache sizes/cache schemes are compared to select a CPU. To the contrary, according to the fifth embodiment of the present invention, CPUs having the same CPU instruction set architecture, different control types, and different numbers of pipelines can be compared.

FIGS. 35B and 35C show examples of the specifications of CPUs having different control methods. CPU B shown in FIG. 35B has a clock frequency of 50 MHz and a 5-pipeline control method, and CPU C shown in FIG. 35C has a clock frequency of 25 MHz and a 3-pipeline control method. The operations of the two, CPU B and CPU C in their pipeline stages are shown in FIGS. 45A to 46B.

FIG. 45A shows pipeline control of CPU B. The pipeline comprises an instruction fetch IF 47001, instruction decoding ID 47002, instruction execution/effective address calculation EX 47003, memory write MEM 47004, and register write-back WB 47005. Respective stages 47006 are executed while overlapping each other, as shown in FIG. 45B. The stall penalty in CPU B is shown in FIG. 36A.

FIGS. 46A and 46B show pipeline control of CPU C. The pipeline includes an instruction fetch/instruction decoding IF+ID 48001, instruction execution/effective address calculation EX 48002, and memory write/register write-back MEM+WB 48003. Respective stages 48004 are executed while overlapping each other, as shown in FIG. 46B. The stall penalty in CPU C is shown in FIG. 36B.

The two CPUs are compared to find that they have different numbers of pipelines and different memory access times but the same instruction set and the same cache size/cache scheme, as shown in FIGS. 35B and 35C. By estimating the task execution time in consideration of different penalties upon occurrence of a pipeline stall, the difference between the two CPUs can be estimated. Therefore, the numbers of execution clocks are obtained using different stall penalties both in the case in which no interrupt is considered and in the case in which an interrupt is considered.

Figure 52:
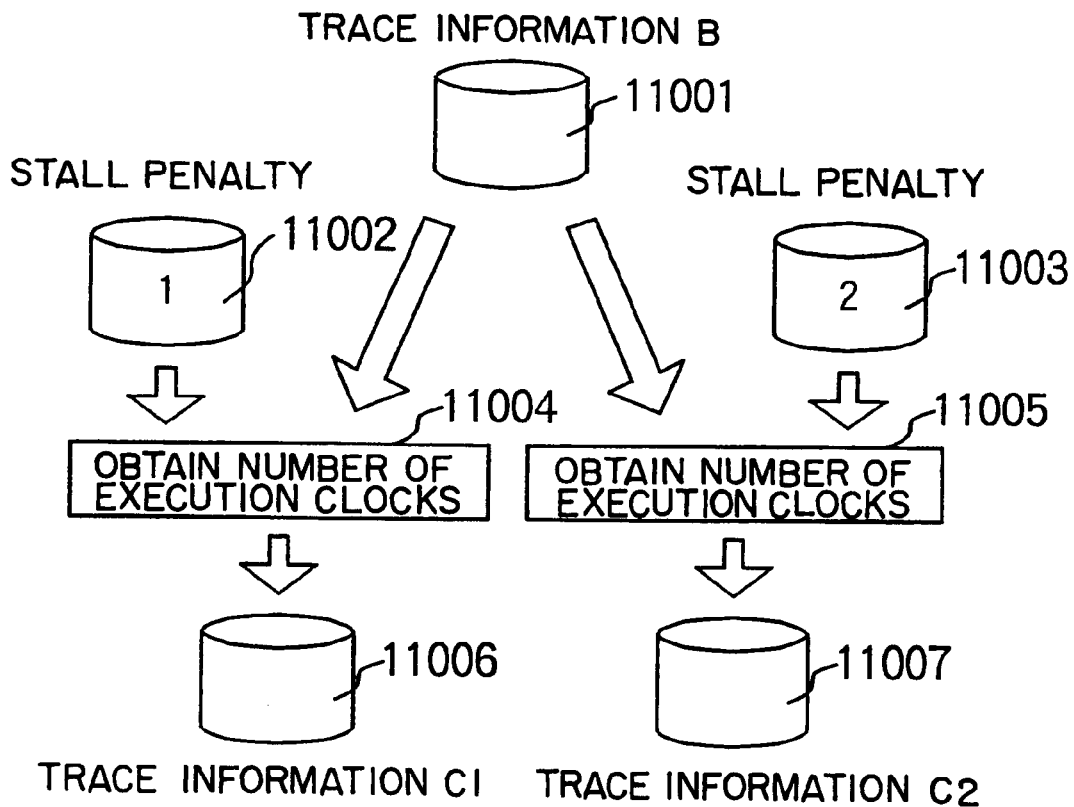
FIG. 52 is a flow chart showing the flow of a process of comparing CPUs having different stall penalties in a task execution time estimating method according to the fifth embodiment of the present invention.

FIG. 52 shows a process of obtaining the number of execution clocks. Trace information B 11001 is the output 1006 from the cache simulation process 1005 shown in FIG. 2 in performing a simulation process not considering any interrupt, and is the output 2007 from the section hit ratio simulation 2006 shown in FIG. 25 in performing a simulation process considering an interrupt. Processes 11004 and 11005 of obtaining the number of execution clocks are the same as the process 1009 in FIG. 2 when no interrupt is considered, and are the same as the process 2009 shown in FIG. 25 when an interrupt is considered.

For example, the value shown in FIG. 36A is set as a stall penalty 11002, and the value shown in FIG. 36B is set as a stall penalty 11003. By calculating the number of execution clocks, the number of execution clocks for CPU B can be attained as execution trace information C1 11006, and the number of execution clocks for CPU C can be attained as execution trace information C2 11007. The subsequent process is the same as the process shown in FIG. 1 or 24. Accordingly, the estimated values of the cache hit ratio and execution time can be obtained.

Since the task execution times of CPUs having the same instruction set architecture and different control methods can be compared, an optimal CPU for a system performance requirement can be selected.

Comparison between estimation results in the third, fourth, and fifth embodiments is comparison between CPUs having the same instruction set architecture. Further, CPUs having different instruction set architectures can also be compared. The sixth embodiment of the present invention concerning this comparison will be described.

Figures 49, 50:
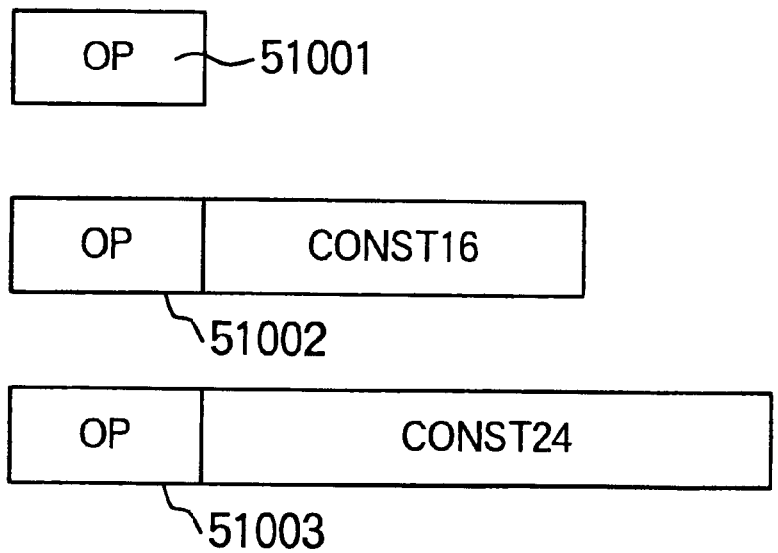
FIG. 49 is an explanatory view showing the instruction structure of CPU D.
FIG. 50 is an explanatory view showing the instruction access pattern of CPU D.

Target CPUs are CPU C described in the fifth embodiment, and CPU D having specifications as shown in FIG. 47. CPU D has a different instruction set architecture from that of CPU C. The instruction word length changes depending on an instruction, and CPU D includes a 1-word instruction 51001, 3-word instruction 51002, and 4-word instruction 51003, as shown in FIG. 50. Further, the data bus has a bus width which allows two words to simultaneously access the bus, so that the instruction access pattern includes 14 patterns 52001 to 52014, as shown in FIG. 50. In FIG. 49, reference numeral 1 denotes a 1-word instruction; 3-1, 3-2, and 3-3, first, second, and third words of a 3-word instruction; and 4-1, 4-2, 4-3, and 4-4, first, second, third, and fourth words of a 4-word instruction.

Figure 51:
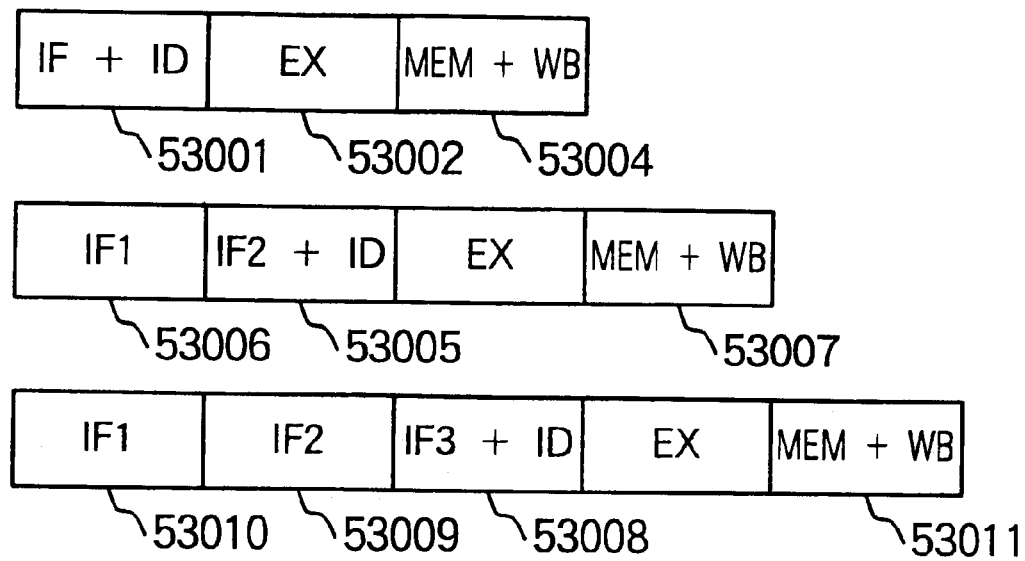
FIG. 51 is an explanatory view showing the pipeline stage of CPU D.

This CPU is controlled by three pipelines. The number of clocks necessary for executing an instruction is 3 to 5, as shown in FIG. 51. The instruction can be executed by three clocks, i.e. an instruction fetch/instruction decoding IF+ID 53001, instruction execution/effective address calculation EX 53002, and memory write/register write-back MEM+WB 53003. Since the instruction word length changes depending on an instruction, the instruction fetch requires three clocks in the worst case even upon a cache hit.

The stall penalty of this CPU may change depending on the number of instruction words. As shown in FIG. 48, the penalty of a stall caused by a branch changes from 3 to 5 depending of the instruction word length.

This CPU and CPU C are compared to find that their programs and interrupt profiles are different because of different instruction sets. For this reason, all the processes shown in FIGS. 2 and 25 must be performed for the two CPUs.

The above-described embodiments are merely examples, and do not limit the present invention. The present invention can be variously modified within the spirit and scope of the invention.

What is claimed is:

1. A task execution time estimating method comprising the steps of:

inputting a program, an initial data value, an execution start address, and an execution end address to an instruction level simulation portion, and outputting a first execution trace of an instruction including a pipeline stall caused by a factor including a combination of a branch and an instruction;

inputting the first execution trace to a cache simulation portion, simulating a pipeline stall caused by a cache miss in correspondence with a cache scheme and a cache size, and outputting a second execution trace;

inputting the second execution trace to an execution clock count portion, obtaining the number of execution clocks per instruction in accordance with the pipeline stall caused by a combination of a branch and an instruction and the pipeline stall caused by a cache miss, and outputting the number of execution clocks as a third execution trace;

inputting the third execution trace to a simulator which simulates instruction execution of a central processing unit (to be referred to as a CPU hereinafter) having a cache memory and a pipeline controller, and estimating and outputting a first cache hit ratio and a first execution time of an entire program which does not consider any interrupt;

inputting the output first execution trace, the first cache hit ratio, the first execution time, an interrupt generation ratio at which an interrupt occurs during task execution, and a cache memory rewrite ratio to a section hit ratio simulation portion, simulating, by a predetermined number of instructions for all interrupts, the cache rewritten in accordance with a cache memory rewrite pattern for all instructions and all interrupts included in the first execution trace, and calculating and outputting an average cache hit ratio;

calculating a weighted average between the first cache hit ratio and the average cache hit ratio for each interrupt, and outputting a fourth execution trace including a cache hit ratio considering an interrupt;

inputting the fourth execution trace to the execution clock count portion, counting the number of execution clocks for each instruction in accordance with the cache hit ratio and the pipeline stall caused by a combination of a branch and an instruction for each instruction, and outputting the number of execution clocks as a fifth execution trace;

inputting the fifth execution trace, and estimating a cache hit ratio and an execution time of an entire program; and combining instruction execution simulators considering an interrupt, thereby estimating an average cache hit ratio and an execution time considering an interrupt.

2. A method of practicing the task execution time estimating method defined in claim 1 for a plurality of CPUs in which at least either cache schemes or cache sizes are different, wherein the step of outputting the second execution trace using the cache simulation portion comprises performing a process for the cache scheme and the cache size of each CPU and obtaining the second execution trace for each CPU, and the step of calculating and outputting the average cache hit ratio using the section hit ratio simulation portion comprises performing a process for the cache scheme, the cache size, and an interrupt generation probability of each CPU, calculating the average cache hit ratio for each CPU, estimating the average cache hit ratio and the execution time considering an interrupt for each CPU, and selecting an optimal CPU in accordance with an application purpose.

3. A method of practicing the task execution time estimating method defined in claim 1 for a plurality of CPUs having different numbers of pipeline stages, wherein the step of outputting the third execution trace and the step of outputting the fifth execution trace comprise obtaining the third execution trace and the fifth execution trace using a stall penalty of each CPU, estimating the average cache hit ratio and the execution time considering an interrupt for each CPU, and selecting an optimal CPU in accordance with an application purpose.

4. A method of practicing the task execution time estimating method defined in claim 1 for a plurality of CPUs having different instruction sets, wherein the step of outputting the first execution trace comprises obtaining the first execution trace using a program of each CPU, estimating the average cache hit ratio and the execution time considering an interrupt for each CPU, and selecting an optimal CPU in accordance with an application purpose.

5. A task execution time estimating method comprising the steps of:

inputting a program, an initial data value, an execution start address, and an execution end address to an instruction level simulation portion, and outputting a first execution trace of an instruction including a pipeline stall caused by a factor including a combination of a branch and an instruction;

inputting the first execution trace to a cache simulation portion, simulating a pipeline stall caused by a cache miss in correspondence with a cache scheme and a cache size, and outputting a second execution trace;

inputting the second execution trace to an execution clock count portion, obtaining the number of execution clocks per instruction in accordance with the pipeline stall caused by a combination of a branch and an instruction and the pipeline stall caused by a cache miss, and outputting the number of execution clocks as a third execution trace;

inputting the third execution trace to a simulator which simulates instruction execution of a CPU having a cache memory and a pipeline controller, and estimating and outputting a first cache hit ratio and a first execution time of an entire program which does not consider any interrupt;

inputting the output first execution trace, the first cache hit ratio, the first execution time, an interrupt generation ratio at which an interrupt occurs during task execution, and a cache memory rewrite ratio to a section hit ratio simulation portion, simulating the cache rewritten in accordance with a cache memory rewrite pattern for only a number of instructions proportional to the interrupt generation ratio that are extracted by sampling from instructions included in the first execution trace, and calculating and outputting an average cache hit ratio;

calculating a weighted average between the first cache hit ratio and the average cache hit ratio for each interrupt, and outputting a fourth execution trace including a cache hit ratio considering an interrupt;

inputting the fourth execution trace to the execution clock count portion, counting the number of execution clocks for each instruction in accordance with the cache hit ratio and the pipeline stall caused by a combination of a branch and an instruction for each instruction, and outputting the number of execution clocks as a fifth execution trace;

inputting the fifth execution trace, and estimating a cache hit ratio and an execution time of an entire program; and combining instruction execution simulators considering an interrupt, thereby estimating an average cache hit ratio and an execution time considering an interrupt.

6. A method of practicing the task execution time estimating method defined in claim 5 for a plurality of CPUs in which at least either cache schemes or cache sizes are different, wherein the step of outputting the second execution trace using the cache simulation portion comprises performing a process for the cache scheme and the cache size of each CPU and obtaining the second execution trace for each CPU, and the step of calculating and outputting the average cache hit ratio using the section hit ratio simulation portion comprises performing a process for the cache scheme, the cache size, and an interrupt generation probability of each CPU, calculating the average cache hit ratio for each CPU, estimating the average cache hit ratio and the execution time considering an interrupt for each CPU, and selecting an optimal CPU in accordance with an application purpose.

7. A method of practicing the task execution time estimating method defined in claim 5 for a plurality of CPUs having different numbers of pipelines, wherein the step of outputting the third execution trace and the step of outputting the fifth execution trace comprise obtaining the third execution trace and the fifth execution trace using a stall penalty of each CPU, estimating the average cache hit ratio and the execution time considering an interrupt for each CPU, and selecting an optimal CPU in accordance with an application purpose.

8. A method of practicing the task execution time estimating method defined in claim 5 for a plurality of CPUs having different instruction sets, wherein the step of outputting the first execution trace comprises obtaining the first execution trace using a program of each CPU, estimating the average cache hit ratio and the execution time considering an interrupt for each CPU, and selecting an optimal CPU in accordance with an application purpose.

* * * * *